(12) United States Patent
de Juan et al.

(10) Patent No.: US 12,505,859 B2
(45) Date of Patent: Dec. 23, 2025

(54) SYSTEM AND METHOD FOR GENERATING VIDEO IN TARGET LANGUAGE

(71) Applicant: Yahoo Assets LLC, Dulles, VA (US)

(72) Inventors: Paloma de Juan, Newy York, NY (US); Alex J. Shaw, New York, NY (US); Eric M. Dodds, Berkeley, CA (US); Benjamin J. Culpepper, Berkeley, CA (US); Kapil Raj Thadani, New York, NY (US); Lakshmi V. Kesiraju, San Jose, CA (US); Praveen Mareedu, Jersey City, NJ (US); Sanika Shirwadkar, Milpitas, CA (US); Xingyue Zhou, Mountain View, CA (US); Yueh-Ning Ku, Sunnyvale, CA (US)

(73) Assignee: Yahoo Assets LLC, New York, NY (US)

( * ) Notice: Subject to any disclaimer, the term of this patent is extended or adjusted under 35 U.S.C. 154(b) by 138 days.

(21) Appl. No.: 17/877,561

(22) Filed: Jul. 29, 2022

(65) Prior Publication Data

US 2024/0038271 A1    Feb. 1, 2024

(51) Int. Cl.
*G06F 40/58* (2020.01)
*G06V 20/40* (2022.01)
(Continued)

(52) U.S. Cl.
CPC ............ *G11B 27/031* (2013.01); *G06F 40/58* (2020.01); *G06V 20/40* (2022.01); *G06V 40/161* (2022.01);
(Continued)

(58) Field of Classification Search
CPC ........ G06F 40/58; G06V 20/40; G06V 40/16; G06V 40/50; G10L 13/08; G10L 15/26;
(Continued)

(56) References Cited

U.S. PATENT DOCUMENTS 8,620,139 B2 * 12/2013 Li ........................ H04N 9/8233
                                                                386/245
10,887,672 B1 * 1/2021 Wu ...................... G06V 30/248
(Continued)

OTHER PUBLICATIONS

Prajwal, K.R., et al.: "A Lip Sync Expert Is All You Need for Speech to Lip Generation in the Wild", MM '20 Oct. 12-16, 2020, Seattle, WA USA, https://arxiv.org/pdf/2003.00418.pdf, 10 pages.
(Continued)

*Primary Examiner* — Daquan Zhao
(74) *Attorney, Agent, or Firm* — Cooper Legal Group LLC

(57) ABSTRACT

One or more computing devices, systems, and/or methods for generating a video in a target language are provided. In an example, a first video, in which a first speaker speaks in a first language, is identified. A translated transcript in a second language is determined. The translated transcript is indicative of a translation of speech spoken by the first speaker in the first video. Based upon the translated transcript and a speaker profile associated with a second speaker, first audio, including an auditory representation of the translated transcript being spoken in a voice of the second speaker, is generated. Based upon the first video and the first audio, a second video, in which mouth movements of the first speaker are aligned with speech of the auditory representation of the first audio, is generated.

20 Claims, 13 Drawing Sheets

(51) Int. Cl.
*G06V 40/16* (2022.01)
*G06V 40/50* (2022.01)
*G10L 13/08* (2013.01)
*G10L 15/26* (2006.01)
*G10L 21/043* (2013.01)
*G10L 21/055* (2013.01)
*G10L 25/57* (2013.01)
*G11B 27/031* (2006.01)

(52) U.S. Cl.
CPC ............ *G06V 40/172* (2022.01); *G06V 40/50* (2022.01); *G10L 13/08* (2013.01); *G10L 15/26* (2013.01); *G10L 21/043* (2013.01); *G10L 21/055* (2013.01); *G10L 25/57* (2013.01)

(58) Field of Classification Search
CPC ..... G10L 21/043; G10L 21/055; G10L 25/57; G11B 27/031
USPC ......................... 386/245, 244, 239, 262, 201
See application file for complete search history.

(56) References Cited

U.S. PATENT DOCUMENTS

| | | | |
|---|---|---|---|
| 11,043,230 B1* | 6/2021 | Riding | G06Q 30/0269 |
| 11,195,507 B2* | 12/2021 | Kumar | H04N 21/440236 |
| 2019/0244623 A1* | 8/2019 | Hall | G06T 13/40 |
| 2021/0065712 A1* | 3/2021 | Holm | G10L 15/02 |
| 2021/0136200 A1* | 5/2021 | Li | G10L 17/26 |
| 2021/0398541 A1* | 12/2021 | Aher | G10L 17/06 |
| 2023/0290332 A1* | 9/2023 | Jawahar | G10L 13/027 |
| 2023/0325611 A1* | 10/2023 | Garg | G06V 30/19167 |

OTHER PUBLICATIONS

Prajwal K R., et al.: "Towards Automatic Face-to-Face Translation", MM '19, Oct. 21-25, 2019, Nice, France, https://arxiv.org/pdf/2003.00418.pdf, 9 pages.

Edresson, Casanova et al, Your TTS: Towards Zero-Shot Multip-Speaker TTS and Zero Shot Voice Conversion for Everyone, Dec. 2021, https://github.com/Edresson/YourTTS/; 6 pages, Retrieved on Oct. 17, 2022.

Prajwal, K.R., MukhopadhyahRudrabha, Namboodiri, Vinay P, Jawahar, C.V.: "A Lip Sync Expert is All you Need for Speech to Lip Generation in the Wild", https://github.com/Rudrabha/Wav2Lip, ACM Multimedia 2020, 7 pages, Retrieved on Oct. 17, 2022.

Helsinki—"NLP Language Technology Research Group at the University of Helsinki", https://huggingface.co/Helsinki-NLP, 122 pages, Retrieved on Oct. 17, 2022.

* cited by examiner

SYSTEM AND METHOD FOR GENERATING VIDEO IN TARGET LANGUAGE

BACKGROUND

Many services, such as websites, applications, etc. may provide platforms for viewing media, such as videos. For example, a user may interact with a service. A video may be presented to the user while interacting with the service. However, the video may be in a language that the user does not understand.

SUMMARY

In accordance with the present disclosure, one or more computing devices and/or methods are provided. In an example, a first video is identified. A transcript, indicative of speech spoken by a speaker in the first video, is determined. The transcript is translated from a first language to a second language to generate a translated transcript in the second language. Based upon the translated transcript and a speaker profile associated with the speaker, first audio, comprising an auditory representation of the translated transcript being spoken in a voice of the speaker, is generated. Based upon the first video and the first audio, a second video, in which mouth movements of the speaker are aligned with speech of the auditory representation of the first audio, is generated.

In an example, a first video, in which a first speaker speaks in a first language, is identified. A translated transcript in a second language is determined. The translated transcript is indicative of a translation of speech spoken by the first speaker in the first video. Based upon the translated transcript and a speaker profile associated with a second speaker, first audio, comprising an auditory representation of the translated transcript being spoken in a voice of the second speaker, is generated. Based upon the first video and the first audio, a second video, in which mouth movements of the first speaker are aligned with speech of the auditory representation of the first audio, is generated.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
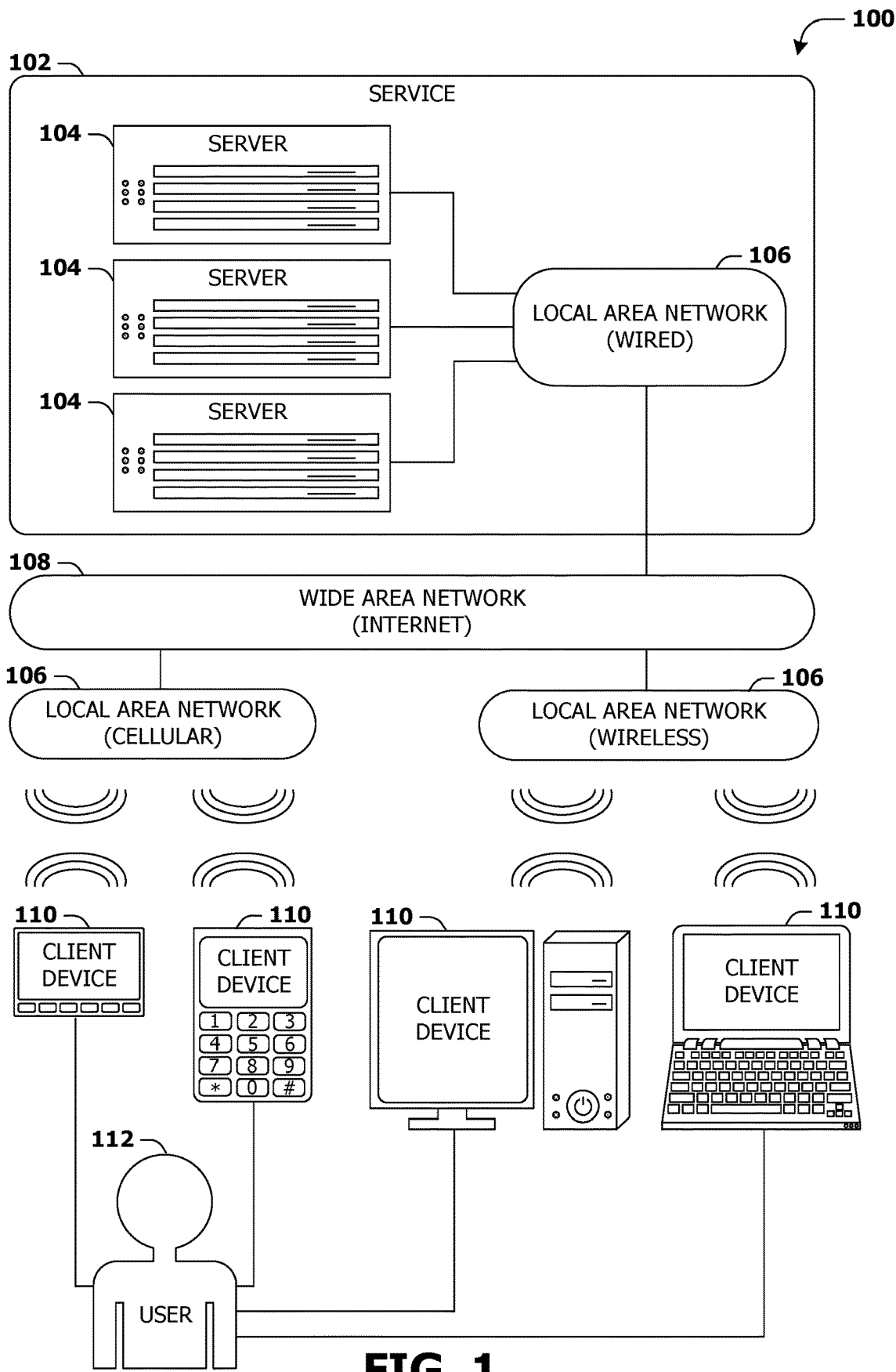
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
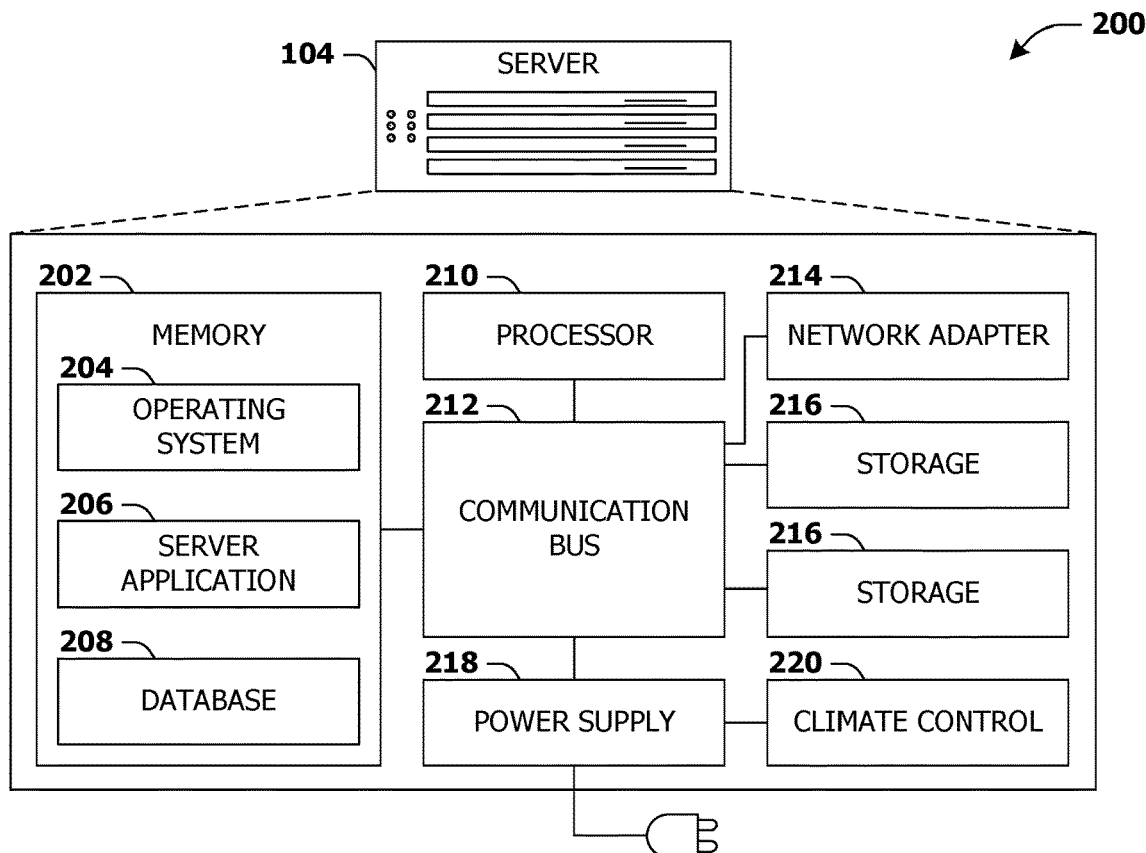
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
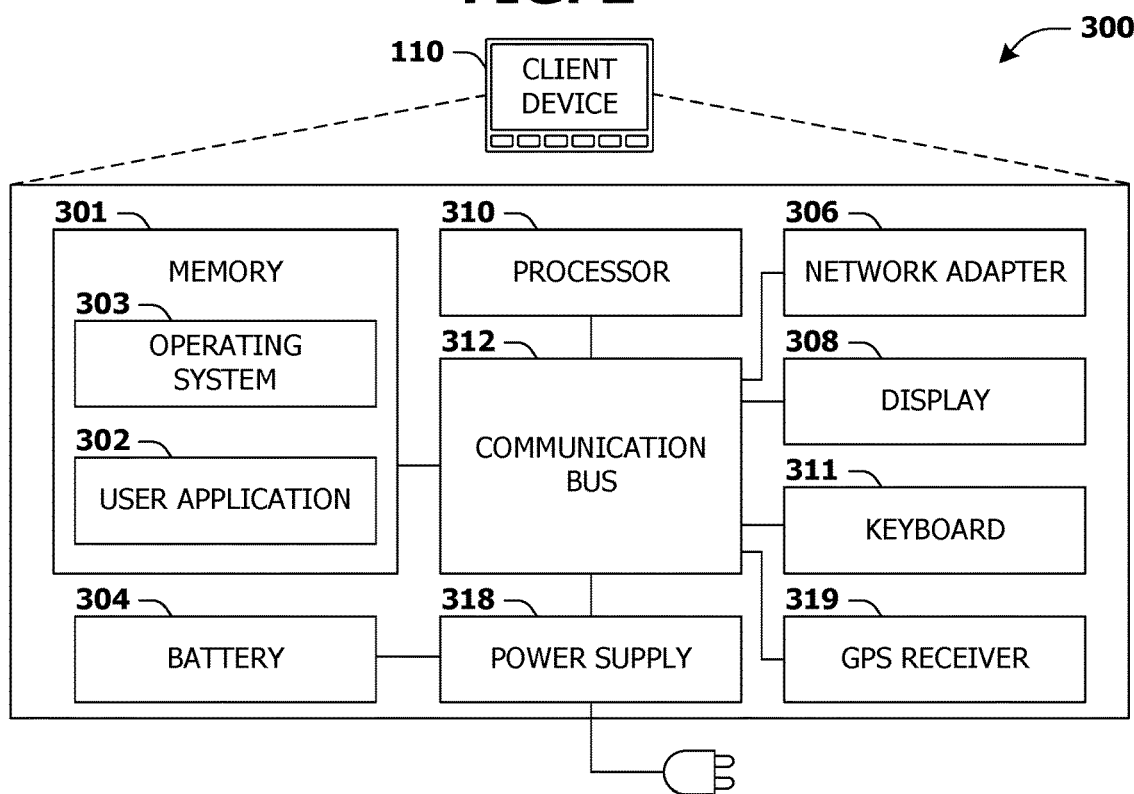
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for video in a target language and/or presenting the video via one or more client devices are provided. A content system, such as a website, an application, etc., may provide a platform for viewing and/or downloading videos. The content system may operate in different countries with different languages. However, content items that are available in a certain language may be limited. Increasing the amount of content that is available in the language may benefit a target audience of users who use the language. For example, by increasing the amount of content in the language, the users of the target audience (who understand and/or prefer the language) may be provided with more content and/or higher quality content. In some systems, this is addressed by displaying subtitles in the language so that users of the target audience can read the subtitles to understand dialog in the videos. However, many users find it difficult and/or inconvenient to have to read subtitles while viewing a video. Thus, some systems provide dubbed versions of content where original speech of a video is replaced with speech in the language of the target audience. However, manually dubbing videos can be expensive, labor intensive and/or time-consuming (e.g., it can take around 6 to 12 weeks or longer to dub a video with voice actors). Further, when voice actors are tasked with dubbing a video, original voices of the video are lost and replaced with the voice actors, and mouth movements (e.g., lip movements) in the video may not be aligned with the translated dialog of the voice actors, which may be distracting and/or unappealing, and/or may lead to a negative user experience of a viewer watching the dubbed video.

Thus, in accordance with one or more of the techniques herein, a video in a target language may be generated. For example, a first video to be dubbed to one or more videos in one or more languages (different from the original language of the first video) may be identified. A transcript of speech of a speaker in the first video may be determined (e.g., automatically determined). The transcript may be translated (e.g., automatically translated) from the original language to the target language to generate a translated transcript. Audio, comprising an auditory representation of the translated transcript being spoken in a voice of the speaker, may be generated (e.g., automatically generated) based upon the translated transcript and a speaker profile associated with the speaker. A second video (e.g., a lip-synchronized video), in which mouth movements of the speaker are aligned with speech of the audio (in the voice of the speaker speaking in the target language), may be generated (e.g., automatically generated) based upon the first video and the audio. Accordingly, the second video and the audio in the target language may be generated automatically with reduced (e.g., zero) manual effort. In this way, one or more of the techniques provided herein may be used to automate the task of generating lip-synchronized videos in various languages, and thus lip-synchronized videos (with corresponding audio) may be generated automatically for any number of languages such that users of a wide range of languages can watch versions of the first video in their own languages. Further, since mouth movements of the speaker in the second video are aligned (e.g., synchronized) with speech of the audio and/or since the speech of the audio is in the voice of the speaker, the second video may be more believable and/or appealing to a viewer of the second video.

Figure 4:
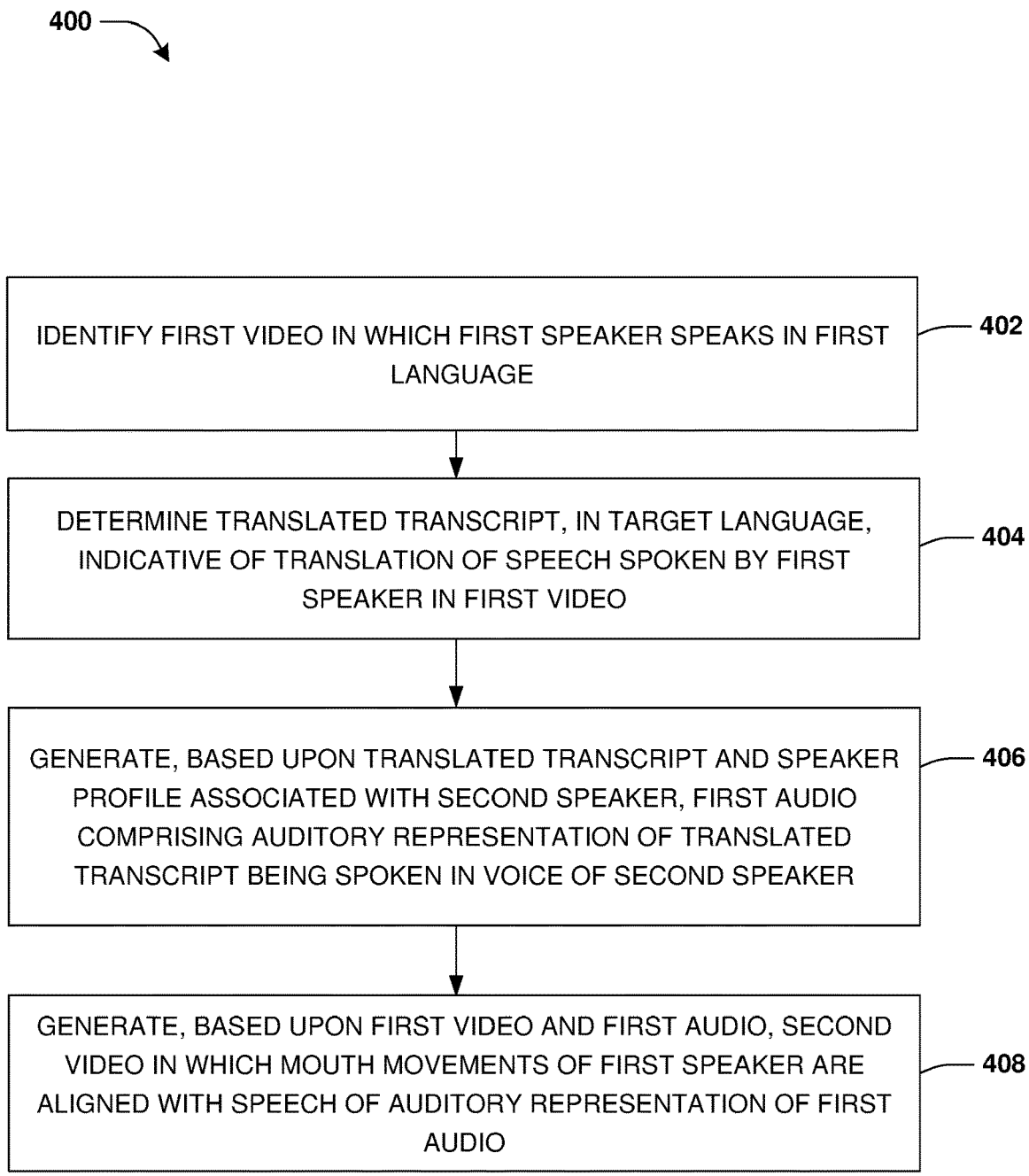
FIG. 4 is a flow chart illustrating an example method for generating a video in a target language and/or presenting the video via one or more client devices.

An embodiment of generating a video in a target language and/or presenting the video via one or more client devices is illustrated by an example method 400 of FIG. 4, and is further described in conjunction with system 501 of FIGS. 5A-5I.

At 402, a first video is identified. For example, the first video may be identified from a video database associated with a content system. The content system may comprise a website, an application, etc. that provides a platform for viewing and/or downloading videos from a server (of the website, the application, etc.). The first video may be associated with a first language. For example, the first video may comprise speech in the first language. In some examples, the first video may be selected for dubbing the first video in one or more target languages different from the first language of the first video. For example, the first video may be selected (for dubbing) in response to the first video being uploaded to the video database and/or in response to receiving a request to dub the first video in one or more target languages. The video database may be stored in one or more servers (associated with the content system). The video database may comprise a data structure corresponding to a plurality of videos. The data structure may comprise the plurality of videos and/or a plurality of sets of information. Each set of information of the plurality of sets of information may correspond to a video of the plurality of videos. Each set of information of the plurality of sets of information may comprise at least one of a title (e.g., a name) of a video of the plurality of videos, an indication of a duration of time of the video, a description of subject matter of the video, a transcript of the video, etc. In an example, the first video may comprise at least one of a news-related video (e.g., a news channel video clip, an internet news video clip, etc.), an instructional video (e.g., a how-to video clip, an educational video clip, etc.), an interview-related video (e.g., a documentary video clip, a video clip of a meeting, etc.), a sports-related video clip, an entertainment-related video clip, etc.

In the first video, a first speaker speaks in the first language. For example, the first speaker may be at least one of an actor, a television host, a politician, a public speaker, etc. Using one or more of the techniques provided herein, speech spoken by the first speaker in the first video (e.g., in the first language) may be translated to a target language, and a dubbed and/or lip synchronized version of the first video that shows the first speaker speaking in the target language may be generated.

At 404, a translated transcript in the target language is determined. The target language is different from the first language spoken by the first speaker in the first video. The translated transcript is indicative of a translation of speech spoken by the first speaker in the first video. In an example, the translated transcript may be generated by translating a transcript (e.g., an original language transcript) in the first language to the target language. The transcript and/or the translated transcript may be determined by the content system. The transcript and/or the translated transcript may be determined in response to identifying the first video (and/or in response to selecting the first video for dubbing the first video in the target language). Alternatively and/or additionally, the transcript and/or the translated transcript may be determined based upon information received from a client (e.g., at least one of a user of the content system, a publisher of the first video, an entity that makes the transcript and/or the translated transcript available for use, etc.). For example, the information received from the client may be indicative of captions (e.g., closed captions) of the first video.

In some examples, the transcript may be indicative of speech spoken by the first speaker in the first video. In an example, the transcript may be determined using one or more automated speech recognition (ASR) techniques (e.g., ASR may be performed on the first video to determine the transcript) and/or one or more other techniques.

Figure 5A:
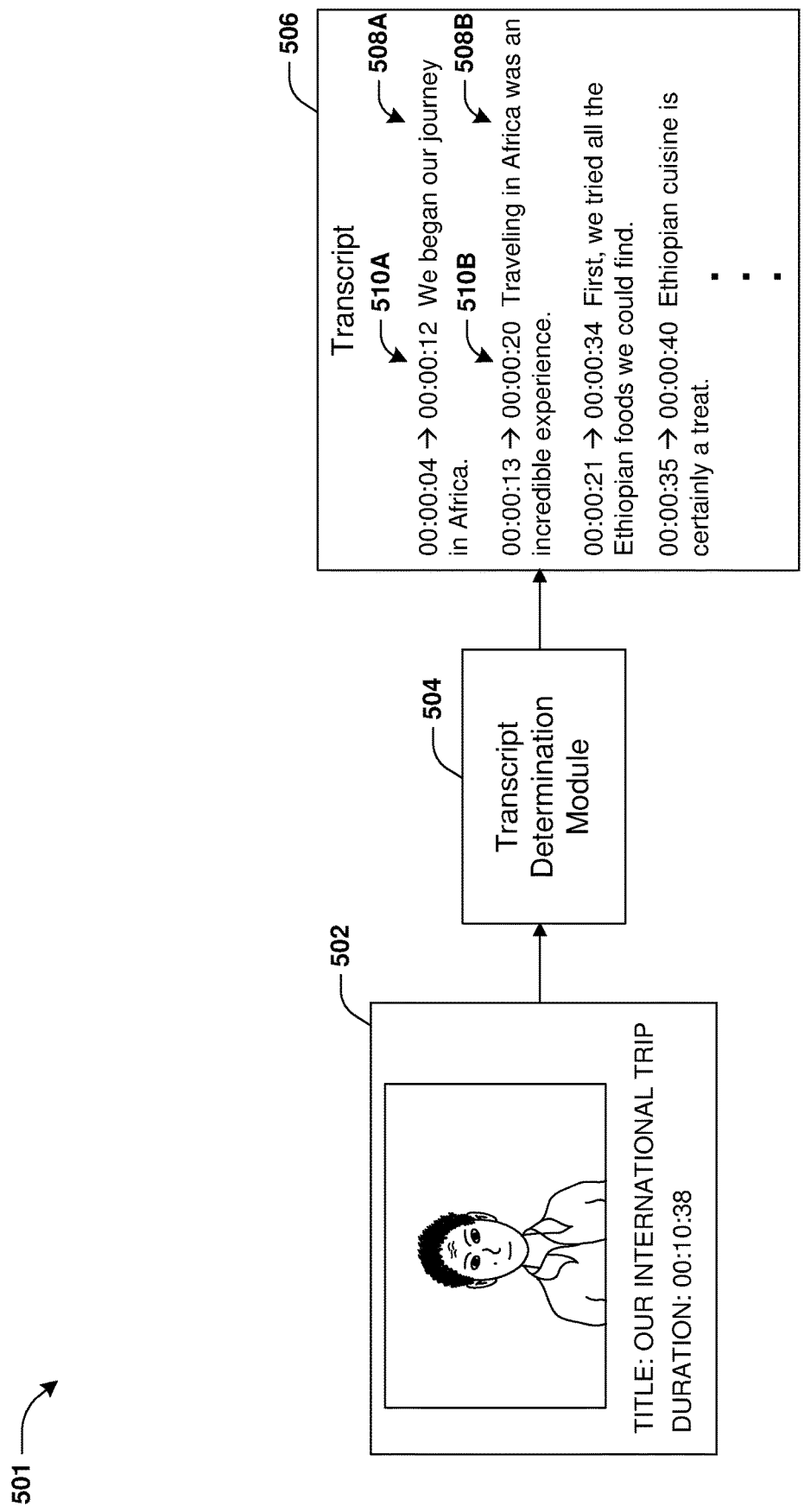
FIG. 5A is a component block diagram illustrating an example system for generating a video in a target language and/or presenting the video via one or more client devices, where a transcript is determined based upon a first video.

FIG. 5A illustrates the transcript (shown with reference number 506) being determined based upon the first video (shown with reference number 502). For example, the first video 502 may be input to a transcript determination module 504 and/or the transcript determination module 504 may output the transcript 506 based upon the first video 502 (e.g., the transcript determination module 504 may determine the transcript 506 using one or more ASR techniques and/or one or more other techniques).

The transcript 506 may comprise a plurality of text segments 508. In some examples, determining the transcript 506 (and/or determining the plurality of text segments 508 of the transcript 506) comprises: (i) determining text indicative of speech spoken by the first speaker in the first video 502, where the text may be determined based upon the information received from the client (e.g., the information may comprise the text and/or timestamps associated with parts of the text) and/or where the text may be determined by analyzing (using one or more ASR techniques and/or one or more other techniques) audio data of the first video 502 to determine the text; and/or (ii) segmenting the text into the plurality of text segments 508. In some examples, a text segment of the plurality of text segments 508 (and/or each text segment of the plurality of text segments 508) corresponds to one or more sentences (e.g., one or more full sentences). For example, segmenting the text into the plurality of text segments 508 may comprise segmenting the text into sets of one or more sentences (where each text segment of one, some and/or all text segments of the plurality of text segments 508 corresponds to a set of one or more sentences). In an example, the text may be analyzed to identify sentence boundaries between sentences, and the text may be segmented into the plurality of text segments 508 based upon the sentence boundaries (e.g., the text may be segmented into the plurality of text segments 508 such that portions of a single sentence are not segmented into multiple text segments of the plurality of segments 508). Embodiments are contemplated in which a text segment of the plurality of text segments 508 does not correspond to a sentence (e.g., a full sentence), such as where the text segment comprises one or more words that do not form a complete sentence. Each text segment of the plurality of text segments 508 is associated with a video segment of the first video 502. The transcript may be indicative of timestamps of video segments associated with the plurality of text segments 508.

In an example, the plurality of text segments 508 may comprise a first text segment 508A (e.g., a first sentence, such as "We began our journey in Africa." in FIG. 5A), a second text segment 508B (e.g., a second sentence, such as "Traveling in Africa was an incredible experience." in FIG. 5A), etc. The transcript 506 may comprise a plurality of timestamps 510 associated with the plurality of text segments 508. For example, the plurality of timestamps 510 may comprise a first timestamp 510A associated with the first text segment 508A (e.g., the first timestamp 510A may indicate that the first text segment 508A corresponds to speech that is spoken in a first video segment spanning from a first time [00:00:04] of the first video 502 to a second time [00:00:12] of the first video 502), a second timestamp 510B associated with the second text segment 508B (e.g., the second timestamp 510B may indicate that the second text segment 508B corresponds to speech that is spoken in a second video segment spanning from a third time [00:00:13] of the first video 502 to a fourth time [00:00:20] of the first video 502), etc.

Figure 5B:
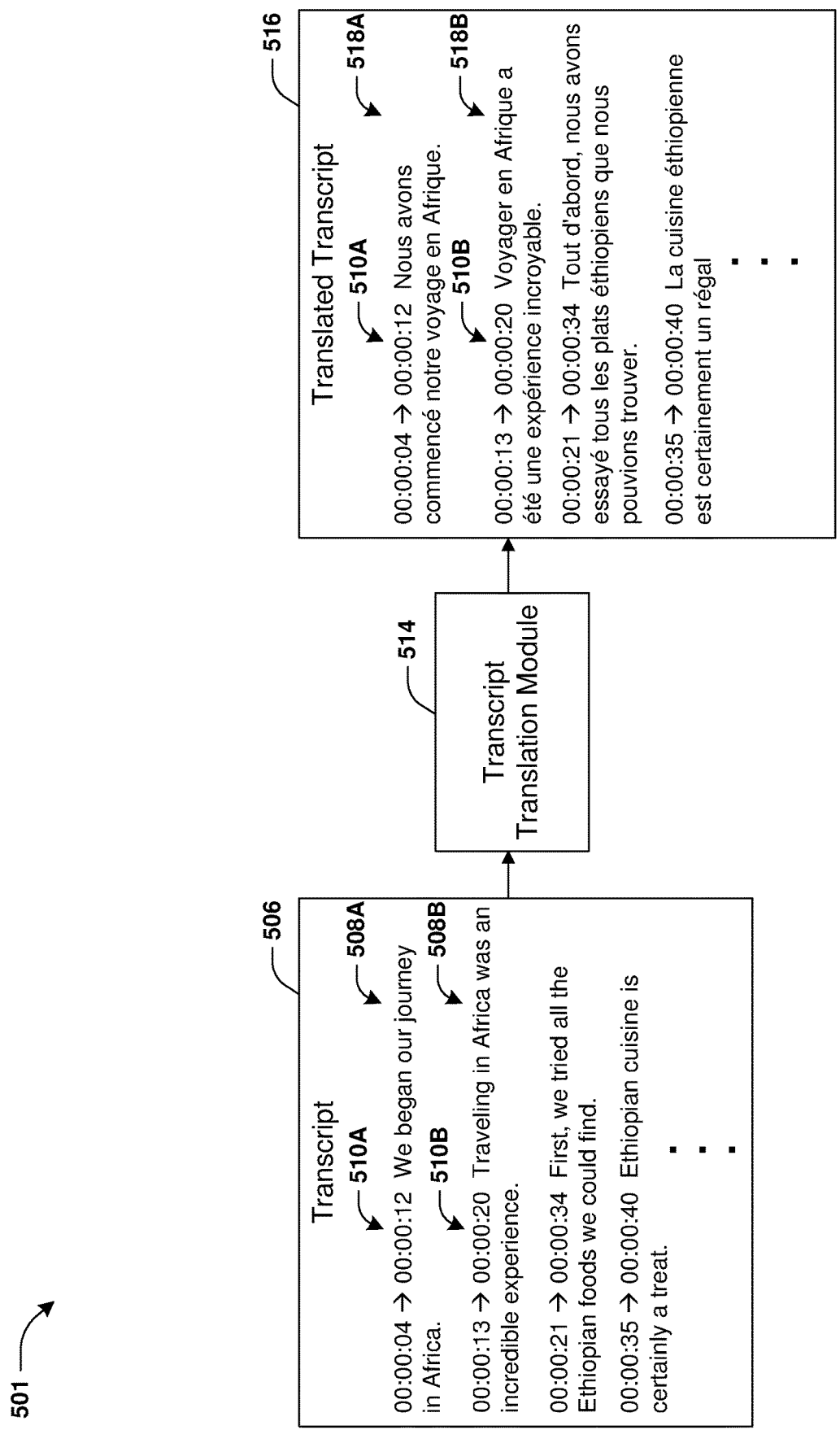
FIG. 5B is a component block diagram illustrating an example system for generating a video in a target language and/or presenting the video via one or more client devices, where a translated transcript is determined based upon a transcript.

FIG. 5B illustrates the translated transcript (shown with reference number 516) being determined based upon the transcript 506. For example, the transcript 506 may be input to a transcript translation module 514 and/or the transcript translation module 514 may output the transcript 506 based upon the transcript 506. The transcript 506 may be translated (by the transcript translation module 514, for example) from the first language to the target language to generate the translated transcript 516. In the example shown in FIG. 5B, the first language is English and the target language is French.

In some examples, the translated transcript 516 comprises a plurality of translated text segments 518, wherein each translated text segment of the plurality of translated text segments 518 is associated with a text segment of the plurality of text segments 508. In an example, the plurality of translated text segments 518 comprises a first translated text segment 518A associated with the first text segment 508A, a second translated text segment 518B associated with the first text segment 508B, etc. In some examples, translated text segments of the plurality of translated text segments 518 are determined separately based upon the plurality of text segments 508, such as where the first text segment 508A is translated from the first language to the target language to determine the first translated text segment 518A, the second text segment 508B is translated from the first language to the target language to determine the second translated text segment 518B, etc. In some examples, the translated transcript 516 may comprise the plurality of timestamps 510 associated with the plurality of text segments 508. For example, the translated transcript 516 may indicate that the first translated text segment 518A is associated with the first timestamp 510A associated with the first video segment, the second translated text segment 518B is associated with the second timestamp 510B associated with the second video segment, etc.

In some examples, the transcript translation module 514 may generate the translated transcript 516 using one or more natural language processing (NLP) techniques, such as one or more machine translation techniques (e.g., the transcript translation module 516 may comprise a machine translation model and/or service). The transcript translation module 514 may comprise a translation machine learning model used to translate the transcript 506 from the first language to the target language to generate the translated transcript 516. The translation machine learning model may comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In an example, the translation machine learning model comprises a transformer based model, such as a transformer based encoder-decoder model. In some examples, the translation machine learning model may be trained using a corpus (e.g., a corpus comprising sentences in the first language and/or translations, of the sentences, in the target language). In an example, the translation machine learning model comprises a pre-trained model (e.g., a pre-trained neural translation model), such as Helsinki-NLP model and/or Opus MT model. In an example, the corpus (used to train the translation machine learning model, for example) comprises an OPUS corpus (open source parallel corpus).

At 406, based upon the translated transcript 516 and a speaker profile associated with a second speaker, first audio comprising an auditory representation of the translated transcript being spoken in a voice of the second speaker may be generated (e.g., the first audio may be synthesized based upon the translated transcript 516 and the speaker profile associated with the second speaker). In some examples, the second speaker is the same as the first speaker, such as where the first audio comprises an auditory representation of the translated transcript being spoken in a voice of the first speaker (e.g., to a listener, the first audio sounds like the first speaker is speaking in the target language). Although at least some techniques of the present disclosure are described with respect to an embodiment in which the second speaker is the same as the first speaker (and the speaker profile is a profile of the first speaker), embodiments are contemplated in which the second speaker is different from the first speaker (e.g., to a listener, the first audio sounds like a speaker different from the first speaker is speaking in the target language).

Figure 5C:
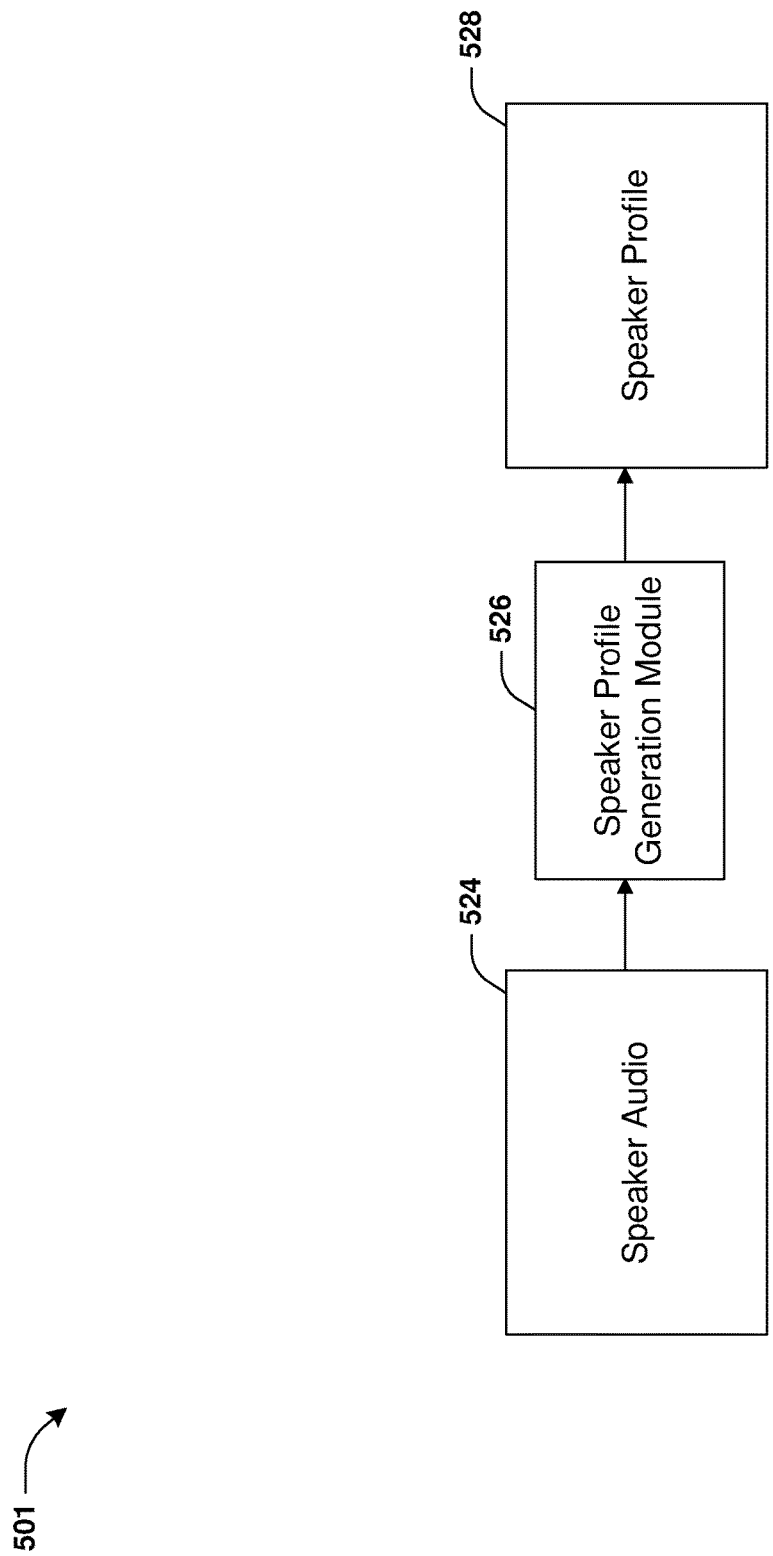
FIG. 5C is a component block diagram illustrating an example system for generating a video in a target language and/or presenting the video via one or more client devices, where a speaker profile associated with a first speaker is generated.

FIG. 5C illustrates the speaker profile (shown with reference number 528) associated with the first speaker being generated. In some examples, the speaker profile 528 may be indicative of one or more characteristics (e.g., speech characteristics) of speech of the first speaker, such as at least one of volume, pitch, frequency, etc. of speech of the first user. The speaker profile 528 may be determined based upon speaker audio 524 associated with the first speaker (e.g., audio in which the first speaker is speaking). For example, the speaker audio 524 may be input to a speaker profile generation module 526 and/or the speaker profile generation module 526 may output the speaker profile 528 based upon the speaker audio 524.

The speaker audio 524 may comprise at least some audio, of the first video 502, in which the first speaker speaks. Alternatively and/or additionally, the speaker audio 524 may comprise audio (in which the first speaker speaks) from one or more other sources of audio (different from the first video 502), such as at least one of one or more videos, one or more audio files, etc. In some examples, resources (e.g., internet resources, such as websites, web applications, databases and/or other internet resources) may be analyzed (e.g., via data mining) to identify the one or more other sources of audio associated with the first speaker, and/or the audio may be extracted from the one or more sources for inclusion in the speaker audio 524. In an example, the one or more sources of audio may comprise a video. Facial recognition may be performed on one or more videos (e.g., videos identified via data mining throughout various resources in the Internet) to determine that the video comprises the face of the first speaker (e.g., and thus comprises audio for the first speaker), wherein audio may be extracted from the video for inclusion in the speaker audio 524 based upon the determination that the video comprises the face of the first speaker. The facial recognition may be performed using one or more of the techniques herein, such as one or more of the techniques discussed below with respect to performing facial recognition using a face profile associated with the first speaker. In some examples, data mining may be performed to find the one or more sources of audio (and/or the audio may be extracted from the one or more other sources of audio for inclusion in the speaker audio 524) in response to a determination that the first video 502 comprises less than a threshold amount of audio in which the first speaker speaks (e.g., the determination that the first video 502 comprises less than the threshold amount of audio in which the first speaker speaks may correspond a determination that there is an insufficient amount of audio, in the first video 502, for use in generating a speaker profile that can be used to accurately synthesize audio in the voice of the first speaker).

In some examples, audio from a source other than the first video 502 (e.g., a source of the one or more other sources of audio) may be selected for inclusion in the speaker audio 524 based upon one or more first properties associated with the audio from the source other than the first video 502. The one or more first properties may comprise one or more topics of the audio (e.g., one or more topics associated with subject matter of dialog of the first speaker in the audio), a valence (e.g., an emotional valence) associated with the audio (e.g., a valence of the first speaker in the audio), a tone of voice associated with the audio (e.g., a tone with which the first speaker speaks in the audio), and/or one or more other properties. In an example, whether or not to include the audio (from the source other than the first video 502) in the speaker audio 524 may be determined based upon a comparison of the one or more first properties associated with the audio with one or more second properties associated with the first video 502 (e.g., the one or more second properties may comprise one or more topics, a valence, a tone of voice, and/or one or more other properties). For example, a similarity score associated with a similarity between the one or more first properties and the one or more second properties may be determined. The audio from the source other than the first video 502 may be included in the speaker audio 524 based upon a determination that the similarity score meets (e.g., exceeds) a threshold similarity score. In some examples, the audio from the source other than the first video 502 may not be included in the speaker audio 524 based upon a determination that the similarity score does not meet (e.g., does not exceed) the threshold similarity score. In some examples, determining whether or not to include the audio from the source other than the first video 502 in the speaker audio 524 based upon a comparison of the similarity score with the threshold similarity score may prevent audio associated with a different context, a different emotion, etc. than the first video 502 from being included in the speaker audio 524. For example, the audio from the source other than the first video 502 may not be included in the speaker audio 524 in a scenario in which the audio from the source other than the first video 502 includes at least one of yelling, singing, etc. by the first speaker whereas the first speaker talks calmly in the first video 502. It may be appreciated that selectively including the audio from the source other than the first video 502 based upon the similarity score exceeding the threshold similarity score may result in generation of the speaker profile 528 with increased accuracy, such as due, at least in part, to generating the speaker profile 528 using audio associated with a context and/or emotion that is similar to the context and/or emotion associated with the first video 502 such that the speaker profile 528 is more applicable to the context, etc. associated with the first video 502, thereby providing for more accurately generating (e.g., synthesizing) audio (in the target language, for example) in the voice of the first speaker using the more accurate speaker profile 528.

In some examples, the speaker audio 524 may comprise isolated speech of the first speaker. In an example, audio may be selected for inclusion in the speaker audio 524 (based upon which the speaker profile 528 is generated) based upon a comparison of an isolation level of the audio with a threshold isolation level. In an example, the isolation level may be determined based upon a volume of a voice of the first speaker in the audio and/or a volume of one or more sounds, other than the voice of the first speaker, in the audio. In some examples, the isolation level may be a function of the volume of the voice of the first speaker and/or the volume of the one or more sounds, such as where a higher value of the volume of the one or more sounds other than the voice may result in a lower value of the isolation level and/or a higher value of the volume of the voice of the first speaker may result in a higher value of the isolation level. The audio may be included in the speaker audio 524 based upon a determination that the isolation level meets (e.g., exceeds) the threshold isolation level. In some examples, the audio may not be included in the speaker audio 524 based upon a determination that the isolation level does not meet (e.g., does not exceed) the threshold isolation level. It may be appreciated that generating the speaker profile 528 using audio that meets the threshold isolation level may result in generation of the speaker profile 528 with increased accuracy, thereby providing for more accurately generating (e.g., synthesizing) audio (in the target language, for example) in the voice of the first speaker using the more accurate speaker profile 528.

The speaker profile generation module 526 may comprise a speaker profile machine learning model used to generate the speaker profile 528 based upon the speaker audio 524. The speaker profile machine learning model may comprise at least one of a neural network, a tree-based model, a machine learning model used to perform linear regression, a machine learning model used to perform logistic regression, a decision tree model, a SVM, a Bayesian network model, a k-NN model, a K-Means model, a random forest model, a machine learning model used to perform dimensional reduction, a machine learning model used to perform gradient boosting, etc. In an example, the speaker profile machine learning model comprises a transformer based model, such as a transformer based encoder-decoder model.

In some examples, the speaker profile 528 may comprise a vector representation generated (by the speaker profile generation module 526, for example) based upon the speaker audio 524. For example, the vector representation may correspond to an embedding (e.g., an embedding-based vector representation). In an example, the vector representation (e.g., the embedding) may be a representation of characteristics (e.g., speech characteristics learned by the speaker profile generation module 526) of speech of the first speaker.

Figure 5D:
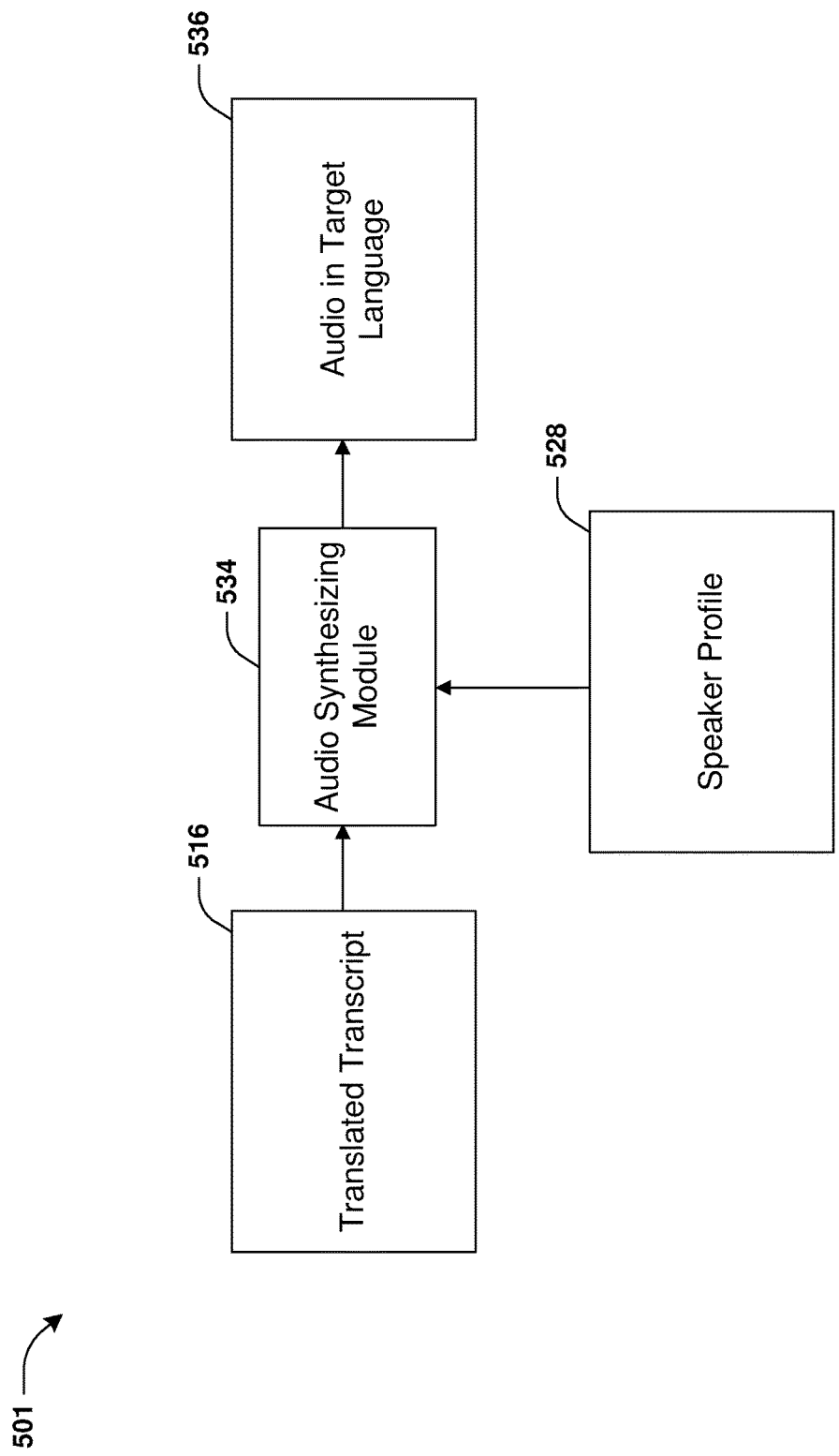
FIG. 5D is a component block diagram illustrating an example system for generating a video in a target language and/or presenting the video via one or more client devices, where first audio is generated based upon a translated transcript and/or a speaker profile.

FIG. 5D illustrates the first audio (shown with reference number 536) being generated (e.g., synthesized) based upon the translated transcript 516 and/or the speaker profile 528. For example, the translated transcript 516 and/or the speaker profile 528 may be input to an audio synthesizing module 534 and/or the audio synthesizing module 534 may output the first audio 536 based upon the translated transcript 516 and/or the speaker profile 528. The first audio 536 comprises an auditory representation of the translated transcript (in the target language) being spoken in a voice of the first speaker.

In some examples, the audio synthesizing module 534 may comprise a text-to-speech (TTS) model, such as YourTTS model or other model. The TTS model may be used to generate the first audio 536 based upon the translated transcript 516 and/or the speaker profile 528.

In some examples, the first audio 536 comprises a plurality of audio segments, wherein each audio segment of the plurality of audio segments is associated with a translated text segment of the plurality of translated text segments 518. In an example, the plurality of audio segments comprises a first audio segment associated with the first translated text segment 518A, a second audio segment associated with the first translated text segment 518B, etc. In an example the first audio segment is generated based upon the first translated text segment 518A and/or the speaker profile 528, the second audio segment is generated based upon the second translated text segment 518B and/or the speaker profile 528, etc. In some examples, audio segments of the plurality of audio segments are generated separately based upon the plurality of translated text segments 518.

In some examples, the plurality of audio segments is generated based upon a plurality of target durations associated with the plurality of translated text segments 518 (such as where an audio segment of the plurality of audio segments is generated to have a duration that matches a target duration of the plurality of target durations). The plurality of target durations may correspond to durations of video segments associated with the plurality of text segments 508. In an example, each target duration of the plurality of target durations may be determined based upon a timestamp of the plurality of timestamps 510. For example, a first target duration of the plurality of target durations is determined based upon the first timestamp 510A associated with the first translated text segment 518A (wherein the first audio segment is generated based upon the first target duration), the second target duration of the plurality of target durations is determined based upon the second timestamp 510B associated with the second translated text segment 518B (wherein the second audio segment is generated based upon the second target duration), etc.

Figure 5E:
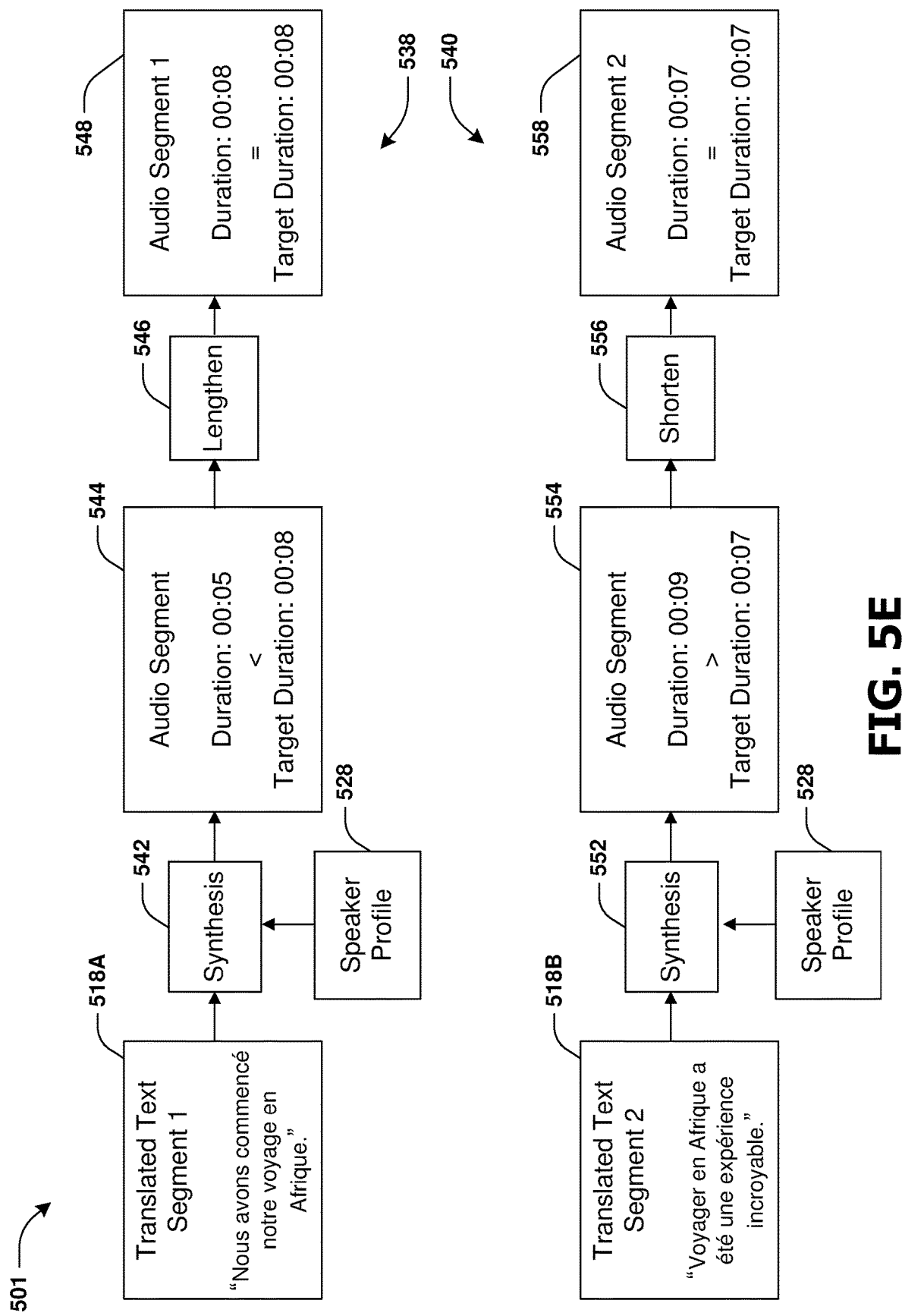
FIG. 5E is a component block diagram illustrating an example system for generating a video in a target language and/or presenting the video via one or more client devices, where a first audio segment and/or a second audio segment are determined.

FIG. 5E illustrates the first audio segment (shown with reference number 548) and/or the second audio segment (shown with reference number 558) being determined.

FIG. 5E shows an example scenario 538 associated with generating the first audio segment 548. An audio segment 544 is synthesized 542 based upon the first translated text segment 518A and the speaker profile 528. The synthesis 542 of the audio segment 544 may be performed using the audio synthesizing module 534 (e.g., the TTS model). The audio segment 544 may be synthesized 542 (based upon the speaker profile 528 associated with the first speaker) to comprise an auditory representation of the first translated text segment 518A being spoken in in a voice of the first speaker. In some examples, a duration of the audio segment 544 may be compared with the first target duration (e.g., the first target duration is 8 seconds). The first target duration is based upon the first timestamp 510A associated with the first translated text segment 518A. The first target duration corresponds to a duration of the first video segment, of the first video, in which the first text segment 508A is spoken by the first speaker. As indicated by the first timestamp 510A (e.g., 00:00:04→00:00:12), the first video segment spans from a first time [00:00:04] of the first video 502 to a second time [00:00:12] of the first video 502. The first target duration may be determined based upon the first time and the second time (e.g., the first target duration may correspond to a difference between the first time and the second time). It may be determined that the duration of the audio segment 544 (e.g., 5 seconds) is smaller than the first target duration (e.g., 8 seconds). Based upon the determination that the duration of the audio segment 544 is smaller than the first target duration, the audio segment 544 may be lengthened 546 (e.g., by 3 seconds) to generate the first audio segment 548 having a duration (e.g., 8 seconds) that matches the first target duration (e.g., 8 seconds). In some examples, the audio segment 544 is lengthened 546 by padding the audio segment 544. For example, the audio segment 544 may be padded with silence to generate the first audio segment 548 having the first target duration. In the example where the duration of the audio segment 544 is 5 seconds and the first target duration is 8 seconds, the audio segment 544 may be padded with 3 seconds of silence to generate the first audio segment 548 (e.g., the first audio segment 548 may comprise the audio segment 544 and 3 seconds of silence). In this way, by generating the first audio segment 548 to have the first target duration, a duration of the first audio segment 548 may match a duration of the first video segment associated with the first text segment 508A, thereby aligning the first audio segment 548 of the first audio 536 with the first video segment of the first video 502.

FIG. 5E shows an example scenario 540 associated with generating the second audio segment 558. An audio segment 554 is synthesized 552 based upon the second translated text segment 518B and the speaker profile 528. The synthesis 552 of the audio segment 554 may be performed using the audio synthesizing module 534 (e.g., the TTS model). The audio segment 554 may be synthesized 552 (based upon the speaker profile 528 associated with the first speaker) to comprise an auditory representation of the second translated text segment 518B being spoken in in a voice of the first speaker. In some examples, a duration of the audio segment 554 may be compared with the second target duration (e.g., the second target duration is 7 seconds). The second target duration is based upon the second timestamp 510B associated with the second translated text segment 518B. The second target duration corresponds to a duration of the second video segment, of the first video, in which the second text segment 508B is spoken by the first speaker. As indicated by the second timestamp 510B (e.g., 00:00:13→00:00:20), the second video segment spans from a third time [00:00:13] of the first video 502 to a fourth time [00:00:20] of the first video 502. The second target duration may be determined based upon the third time and the fourth time (e.g., the second target duration may correspond to a difference between the third time and the fourth time). It may be determined that the duration of the audio segment 554 (e.g., 9 seconds) is larger than the second target duration (e.g., 7 seconds). Based upon the determination that the duration of the audio segment 554 is larger than the second target duration, the audio segment 554 may be shortened 556 (e.g., by 2 seconds) to generate the second audio segment 558 having a duration (e.g., 7 seconds) that matches the second target duration (e.g., 7 seconds). In some examples, the audio segment 554 is shortened 556 by increasing the speed of audio of the audio segment 554 (e.g., speeding up audio of the audio segment 554 without pitch shifting). For example, the audio segment 554 may be shortened to generate the second audio segment 558 having the second target duration. In the example where the duration of the audio segment 554 is 9 seconds and the second target duration is 7 seconds, a speed of audio of the audio segment 554 may be increased (e.g., without pitch shift) to generate the second audio segment 558 being 2 seconds shorter than the audio segment 554. In this way, by generating the second audio segment 558 to have the second target duration, a duration of the second audio segment 558 may match a duration of the second video segment associated with the second text segment 508B, thereby aligning the second audio segment 558 of the first audio 536 with the second video segment of the first video 502.

Other audio segments of the plurality of audio segments (other than the first audio segment 548 and the second audio segment 558) may be generated using one or more of the techniques provided herein with respect to generating the first audio segment 548 and/or the second audio segment 558.

It may be appreciated that automatically generating the plurality of audio segments of the first audio 536 according to the plurality of target durations may cause audio segments of the plurality of audio segments to have the same durations as video segments, of the first video 502, corresponding to the audio segments, thereby automatically aligning the plurality of audio segments of the first audio 536 with corresponding video segments of the first video 502 and/or preventing misalignment of dialog of the first audio 536 with the first video 502. For example, the first audio segment 548 of the first audio 536 is automatically aligned with the first video segment that is associated with dialog of the first audio segment 548 (e.g., the dialog of the first audio segment 548 corresponds to a translation of original dialog of the first video segment), the second audio segment 548 of the first audio 536 is automatically aligned with the second video segment associated with dialog of the second audio segment 548 (e.g., the dialog of the second audio segment 558 corresponds to a translation of original dialog of the second video segment), etc. In this way, the first audio 536 may not have to be manually adjusted and/or modified in order to align timing of the first audio 536 with timing of the first video 502.

In some examples, rather than (and/or in addition to) shortening or lengthening audio segments to have durations that align with corresponding video segments, video segments of the first video 502 may be shortened (e.g., sped up) or lengthened (e.g., stretched, such as slowed down) to have durations that match and/or align with corresponding audio segments (e.g., audio segments that are synthesized based on the speaker profile 528 and translated text segments of the plurality of translated text segments 518). In an example, rather than (and/or in addition to) lengthening 546 the audio segment 544 to generate the first audio segment 548 that is aligned with the first video segment of the first video 502, the first video segment of the first video 502 may be shortened (e.g., sped up) to generate a modified first video segment that is aligned with the audio segment 544 (e.g., a duration of the modified first video segment may match a duration of the audio segment 544), wherein the modified first video segment (rather than the first video segment, for example) and/or the audio segment 544 (rather than the first audio segment 548, for example) may be used to generate a lip-synchronized video (e.g., the second video 566 discussed below). In an example, rather than (and/or in addition to) shortening 556 the audio segment 554 to generate the second audio segment 558 that is aligned with the second video segment of the first video 502, the second video segment of the first video 502 may be lengthened (e.g., stretched, such as slowed down) to generate a modified second video segment that is aligned with the audio segment 554 (e.g., a duration of the modified second video segment may match a duration of the audio segment 554), wherein the modified second video segment (rather than the second video segment, for example) and/or the audio segment 554 (rather than the second audio segment 558, for example) may be used to generate a lip-synchronized video (e.g., the second video 566 discussed below). In some embodiments, shortening and/or lengthening video segments of the first video 502 to generate modified video segments that are aligned with audio segments and/or using the modified video segments to generate a lip-synchronized video (e.g., the second video 566 discussed below) may cause the lip-synchronized video to have a duration that is different than a duration of the first video 502.

At 408, based upon the first video 502 and the first audio 536, a second video (e.g., a lip-synchronized video) is generated in which mouth movements of the first speaker are aligned with speech of the auditory representation of the first audio 536. In an example, the second video corresponds to a lip-synchronized video in which mouth movements (e.g., lip movements) of the first speaker are synchronized with the speech of the first audio 536 (e.g., to a viewer of the second video, the first speaker appears to be speaking in the target language). In some examples, the second video is generated via unconstrained lip-synchronizing (e.g., automatic unconstrained lip-synchronizing).

Figure 5F:
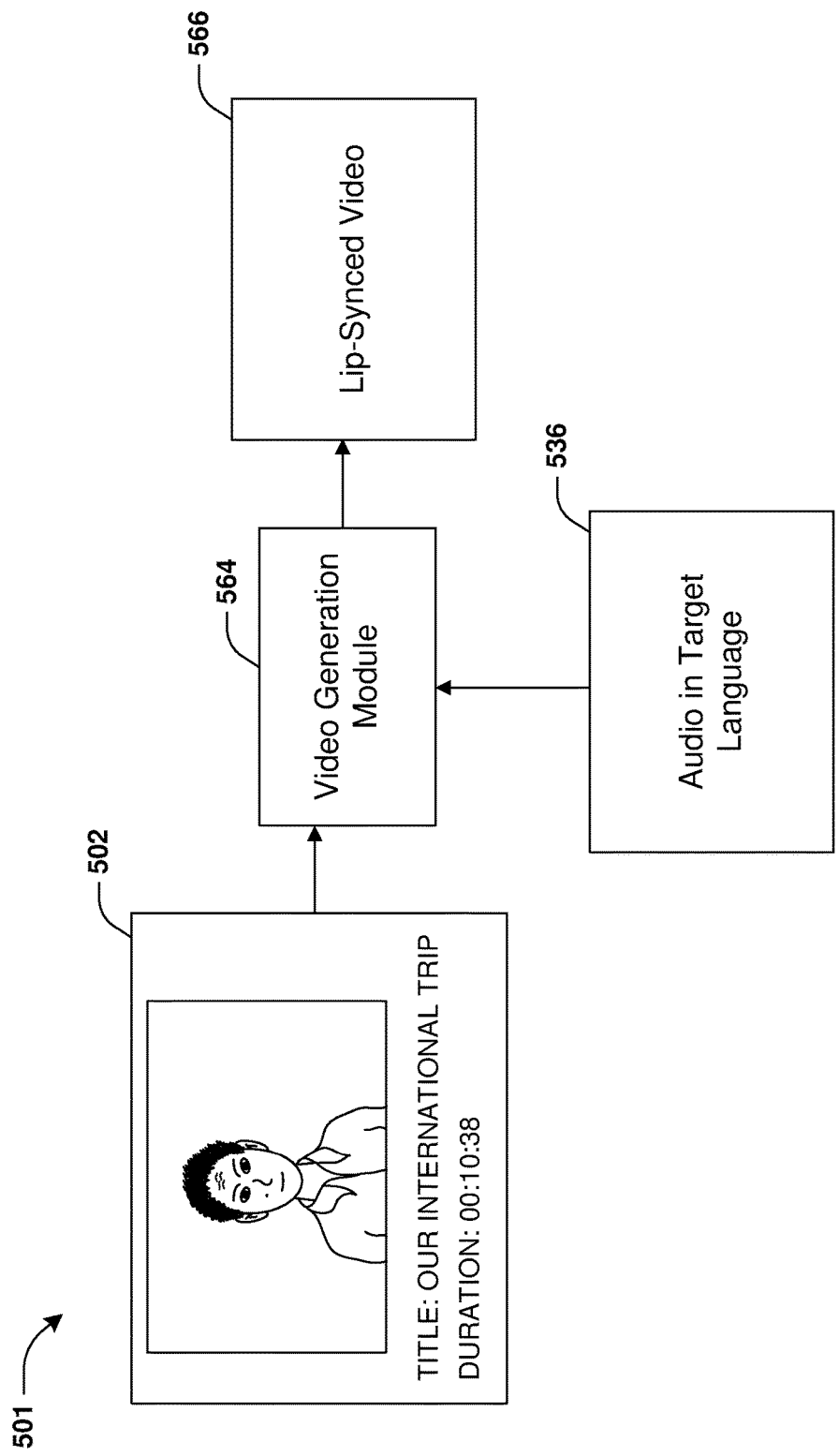
FIG. 5F is a component block diagram illustrating an example system for generating a video in a target language and/or presenting the video via one or more client devices, where a second video is generated based on a first video and first audio.

FIG. 5F illustrates the second video (shown with reference number 566) being generated based upon the first video 502 and/or the first audio 536. For example, the first video 502 and/or the first audio 536 may be input to a video generation module 564 (e.g., an automatic lip-synchronization module) and/or the video generation module 564 may output the second video 566 based upon the first video 502 and/or the first audio 536. The second video 566 comprises an auditory representation of the translated transcript 516 (in the target language) being spoken in a voice of the first speaker.

In some examples, the face of the first speaker in the first video may be identified. For example, the face of the first speaker may be identified using one or more face detection techniques and/or one or more facial recognition techniques. In some examples, based upon the identification of the face of the first speaker, pixels of the first video 502 may be modified to generate the second video 566. For example, the pixels may be modified such that mouth movements (e.g., lip movements) of the first speaker in the second video 566 are aligned with (e.g., synchronized with) speech of the first audio (such that it appears that the first speaker is speaking in the target language, for example). In some examples, the pixels that are modified may correspond to a region comprising a mouth of the first speaker. For example, the pixels that are modified may correspond to a portion, of the face of the first speaker, that comprises the mouth of the first speaker.

Figure 5G:
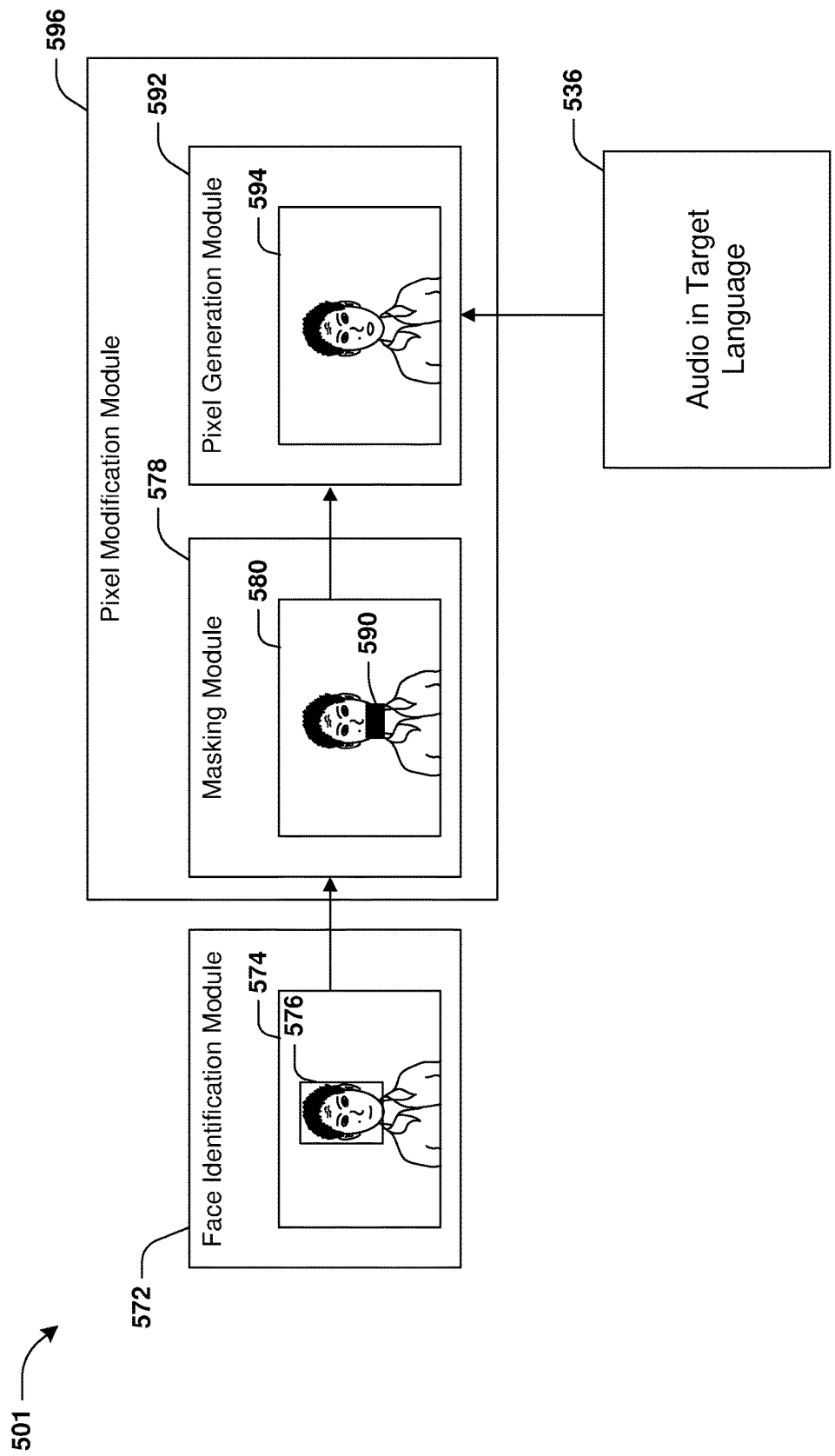
FIG. 5G is a component block diagram illustrating an example system for generating a video in a target language and/or presenting the video via one or more client devices, where pixels of a first video are modified to align mouth movements of a first speaker with speech of first audio.

FIG. 5G illustrates modification of pixels of the first video 502 to align mouth movements (e.g., lip movements) of the first speaker with speech of the first audio 536. In some examples, a face identification module 572 may identify the face of the first speaker in the first video 502. For example, the face identification module 572 may determine a region 576 of a video frame 574 of the first video 502 in which the face of the first speaker is positioned. In some examples, the face identification module 572 may identify the face using one or more face detection techniques. In an example in which a plurality of faces is detected in the video frame 574, the face of the first speaker may be identified based upon a determination that the face is the largest face (and/or occupies the most space of the video frame 574) among the plurality of faces. Alternatively and/or additionally, in an example in which a plurality of faces is detected in the video frame 574, the face of the first speaker may be identified based upon a determination that lips of the face are moving, in the first video 502, during a portion of the first video 502 that comprises the video frame 574.

In some examples, the face identification module 572 may identify the face using one or more facial recognition techniques. In some examples, facial recognition may be performed on the video frame 574 to identify the face of the first speaker. The facial recognition may be performed using a face profile associated with the first speaker. In some examples, the face profile is generated based upon one or more images comprising the face of the speaker. For example, the one or more images may comprise one or more video frames of one or more videos and/or one or more images (e.g., standalone images) that are not part of videos. In some examples, the face profile may comprise face information indicative of characteristics of the face of the first speaker and/or mouth information indicative of characteristics of the mouth (e.g., lips) of the first speaker. Facial recognition may be performed on the video frame 574 to identify the face of the first speaker in the video frame 574 (e.g., to determine the region 576 of the video frame 574 in which the face of the first speaker is positioned), wherein the facial recognition may comprise (i) performing face detection to detect one or more faces in the video frame 574; and/or (ii) analyzing, based upon the face profile associated with the first speaker, the one or more faces to determine whether or not a face of the one or more faces corresponds to the face of the first speaker. In some examples, in response to determining that a face of the one or more faces matches the face of the first speaker, pixels corresponding to at least a portion of the face may be modified using a pixel modification module 596. In some examples, in response to determining that no face of the one or more faces matches the face of the first speaker (e.g., none of the one or more faces are recognized as being the face of the first speaker), pixels of the video frame 574 may not be modified and/or an unmodified version of the video frame 574 may be included in the second video 566. Accordingly, using the face profile to perform facial recognition to identify the face of the first speaker (for pixel modification purposes, for example) may provide for increased accuracy of the identification of the face of the first speaker, and thus provide for increased accuracy of generation of the second video 566. For example, in embodiments in which the face profile is not used to identify the face of the first speaker, the wrong face (e.g., a face of a person different from the first speaker) may be identified as the face of the first speaker, and pixels corresponding to a mouth of the different person may mistakenly be modified to be aligned with speech of the first audio 536 (even though it is the first speaker, and not the different person, whose lips should be aligned with speech of the first audio 536, for example).

In some examples, based upon the identification of the face of the first speaker in the video frame 574 (e.g., based upon the region 576 in which the face of the first speaker is positioned in the video frame 574), pixels of the video frame 574 are modified using the pixel modification module 596 to generate a modified video frame 594 for inclusion in the second video 566 (e.g., the lip-synchronized video). The pixels of the video frame 574 that are modified may correspond to a portion, of the face of the first speaker, that comprises the mouth of the first speaker. In some examples, the pixels of the video frame 574 may be modified (to generate the modified video frame 594) such that a mouth position of the mouth of the first speaker (e.g., positions of lips of the first speaker) and/or a mouth shape of the mouth of the first speaker (e.g., shape of lips of the first speaker) are aligned with speech of the first audio 536, such as aligned with a portion of the first audio 536 that corresponds to a portion, of the first video 502, comprising the video frame 574.

In some examples, pixels of the video frame 574 are modified to generate the modified video frame 594 by: (i) masking, using a masking module 578, a region of the video frame 574 to generate a masked video frame 580; and/or (ii) generating, using a pixel generation module 592, pixels in the masked region to generate the modified video frame 594 comprising a representation of the mouth of the first speaker that is aligned with speech of the first audio 536. In the example shown in FIG. 5G, the video frame 574 of the first video 572 may show the mouth of the first speaker in a closed position, whereas the modified video frame 594 may show the mouth of the first speaker in an open position.

In some examples, the masked video frame 580 (e.g., a masked version of the video frame 574) may be generated using the masking module 578 based upon the identification of the face of the first speaker in the video frame 574 (e.g., based upon the region 576 in which the face of the first speaker is positioned in the video frame 574). The masking module 578 may mask a first region 590 of the video frame 574 and/or may not mask a second region of the video frame 574 to generate the masked video frame 580 (e.g., the second region may correspond to a region, of the video frame 574, that is outside the first region 590). In some examples, the first region 590 may be masked based upon the identification of the face of the first speaker (e.g., the first region 590 may be masked based upon the region 576 in which the face of the first speaker is positioned in the video frame 574). In an example, the first region 590 may comprise a portion of the face of the first speaker, such as a bottom portion of the face of the first speaker (e.g., the portion of the face of the first speaker may correspond to a bottom half of the face of the first speaker). The portion of the face of the first speaker in the first region 590 may comprise the mouth (e.g., lips) of the first speaker.

In some examples, pixels corresponding to the first region 590 (e.g., masked region) of the masked video frame 580 are generated using the pixel generation module 592 to generate the modified video frame 594 for inclusion in the second video 566 (e.g., the lip-synchronized video). The pixels may be generated based upon the first audio 536 (e.g., the first audio 536 may be input to the pixel generation module 592). The pixels may be generated to comprise a representation of the mouth of the first speaker that is aligned with speech of the first audio 536, such as a portion of the first audio 536 at a time of the first audio 536 that corresponds to a time, of the first video 502, associated with the video frame 574. For example, the pixel generation module 592 may generate the pixels such that, in the modified video frame 594, the mouth position of the mouth of the first speaker (e.g., positions of lips of the first speaker) and/or the mouth shape of the mouth of the first speaker (e.g., shape of lips of the first speaker) are aligned with speech of the first audio 536. In some examples, the pixel generation module 592 may generate the pixels based upon the face profile (e.g., based upon the mouth information indicative of characteristics of the mouth of the first speaker) such that the modified video frame 594 is generated to have a more accurate representation of the mouth of the first speaker.

In some examples, the second video 566 (e.g., the lip-synchronized video) is generated using a model, such as a machine learning model. For example, the pixel modification module 596 (and/or the pixel generation module 592) may comprise the model (e.g., using the model, the pixel modification module 596 may modify pixels of the video frame 574 to generate the modified video frame 594 for inclusion in the second video 566). The model may comprise at least one of a neural network, a tree-based model, a machine learning model used to perform linear regression, a machine learning model used to perform logistic regression, a decision tree model, a SVM, a Bayesian network model, a k-NN model, a K-Means model, a random forest model, a machine learning model used to perform dimensional reduction, a machine learning model used to perform gradient boosting, etc. In an example, the model comprises a generative adversarial network (GAN) model. For example, the GAN model may be used to generate the pixels, of the modified video frame 594, corresponding to the first region 590 (e.g., the masked region).

In some examples, the pixel generation module 592 may comprise a discriminator configured to analyze the modified video frame 594 (and/or a portion of the modified video frame 594 comprising a representation of the face of the first speaker) to determine whether or not the face (with augmented mouth region, for example) in the modified video frame 594 is real and/or whether or not the augmented portion of the face of the first speaker (e.g., the portion of the face of the first speaker that is generated by the pixel generation module 592) is consistent with one or more other portions (e.g., non-augmented portion) of the face of the first speaker.

In some examples, the modified video frame 594 (and/or the portion of the modified video frame 594) may be analyzed (using the discriminator, for example) to determine a real score. The real score may be indicative of a likelihood that the face of the first speaker in the modified video frame 594 is real. The discriminator may output a determination that the face of the first speaker in the modified video frame 594 is real based upon the real score meeting (e.g., exceeding) a real score threshold. The discriminator may output a determination that the face of the first speaker in the modified video frame 594 is not real based upon the real score not meeting (e.g., not exceeding) the real score threshold.

In some examples, the modified video frame 594 (and/or the portion of the modified video frame 594) may be analyzed (using the discriminator, for example) to determine a consistency score. The consistency score may be indicative of a level of consistency of the augmented portion of the face with the one or more other portions of the face. The discriminator may output a determination that the augmented portion of the face of the first speaker is consistent with the one or more other portions of the face of the first speaker based upon the consistency score meeting (e.g., exceeding) a consistency score threshold. The discriminator may output a determination that the augmented portion of the face of the first speaker is inconsistent with the one or more other portions of the face of the first speaker based upon the consistency score not meeting (e.g., not exceeding) the consistency score threshold.

In some examples, the modified video frame 594 may be included in the second video 566 (e.g., the lip-synchronized video) based upon a determination, by the discriminator, that the face of the first speaker in the modified video frame 594 is real and/or that the augmented portion of the face of the first speaker is consistent with the one or more other portions of the face of the first speaker. In some examples, in response to a determination, by the discriminator, that the face of the first speaker in the modified video frame 594 is not real and/or that the augmented portion is inconsistent with the one or more other portions, the pixel generation module 592 may further generate one or more modified video frames (e.g., the one or more modified video frames may be generated with different parameters than the modified video frame 594). The one or more modified video frames may be analyzed (using the discriminator) to determine whether or not to include a video frame, of the one or more modified video frames, in the second video 566. For example, a video frame, of the one or more modified video frames, may be included in the second video 566 in based upon a determination, by the discriminator, that the face of the first speaker in the video frame is real and/or that, in the video frame, the augmented portion of the face of the first speaker is consistent with the one or more other portions of the face of the first speaker. In some examples, modified video frames corresponding to the video frame 574 may be generated until it is determined (by the discriminator) that a modified video frame is real and/or consistent, wherein the modified video frame that is determined to be real and/or consistent may be included in the second video 566.

It may be appreciated that by including the modified video frame 594 in the second video 566 based upon a determination that the modified video frame 594 is real (and/or that the augmented portion of the face of the first speaker is consistent with the one or more other portions of the face of the first speaker), the second video 566 may be generated with increased accuracy and/or may have a more realistic representation of the first speaker speaking in the target language. For example, using the discriminator in accordance with the techniques herein may result in the augmented portion of the face to be conditioned on the one or more other portions of the face such that the face is more realistic to a viewer of the second video 566.

In some examples, one or more of the techniques shown in and/or described with respect to FIG. 5G (for modifying pixels of the video frame 574 to generate the modified video frame 594 for inclusion in the second video 566, for example) may be performed on one, some and/or all video frames of the first video 502 to generate the second video 566 in which mouth movements (e.g., lip movements) of the first speaker are aligned with (e.g., synchronized with) speech of the first audio 536.

In some examples, video segments of the second video 566, corresponding to video segments of the first video 502, are aligned with audio segments (of the plurality of audio segments) of the first audio 536. The video segments of the second video 566 may be aligned with the plurality of audio segments due to the plurality of audio segments of the first audio 536 being aligned with corresponding video segments of the first video 502 (e.g., as a result of generating the plurality of audio segments based upon the plurality of target durations). For example, a third video segment of the second video 566 may be generated based upon the first video segment of the first video 502 and/or the first audio segment 548 of the plurality of audio segments. For example, video frames of the first video segment of the first video 502 are modified, based upon the first audio segment 548, to generate video frames (e.g., modified video frames) of the third video segment of the second video 566, wherein: (i) video frames of the third video segment are generated such that mouth movements (e.g., lip movements) of the first speaker in the third video segment are aligned with (e.g., synchronized with) speech of the first audio segment 548; and/or (ii) a duration of the third video segment matches a duration of the first video segment and a duration of the first audio segment 548 (e.g., the duration of the third video segment, the duration of the first video segment and the duration of the first audio segment 548 are equal to the first target duration). Alternatively and/or additionally, a fourth video segment of the second video 566 may be generated based upon the second video segment of the first video 502 and/or the second audio segment 558 of the plurality of audio segments. For example, video frames of the second video segment of the first video 502 are modified, based upon the second audio segment 558, to generate video frames (e.g., modified video frames) of the fourth video segment of the second video 566, wherein: (i) video frames of the fourth video segment are generated such that mouth movements (e.g., lip movements) of the first speaker in the fourth video segment are aligned with (e.g., synchronized with) speech of the second audio segment 558; and/or (ii) a duration of the fourth video segment matches a duration of the second video segment and a duration of the second audio segment 558 (e.g., the duration of the fourth video segment, the duration of the second video segment and the duration of the second audio segment 558 are equal to the second target duration). Thus, one or more of the techniques of the present disclosure may provide for automatic alignment between timing of the first video 502, timing of the first audio 536 and timing of the second video 566.

In some examples, the second video 566 may be generated using Wav2Lip. For example, pixels of a video frame (e.g., the video frame 574) may be modified to generate a modified video frame (e.g., the modified video frame 594) for inclusion in the second video 566 using Wav2Lip.

In some examples, the second video 566 may be presented via a first client device. The first client device may comprise at least one of a laptop, a desktop computer, a phone, a computer, a wearable device, a smart device, a television, any other type of computing device, hardware, etc. The content system may provide the second video 566 for presentation via a video interface. The video interface may present the second video 566 on the first client device. In some examples, the second video 566 is presented in conjunction with the first audio 536 (in the target language). For example, presenting the second video 566 may comprise displaying the second video 566 via a display of the first client device and outputting the first audio via a loudspeaker of the first client device.

Figure 5H:
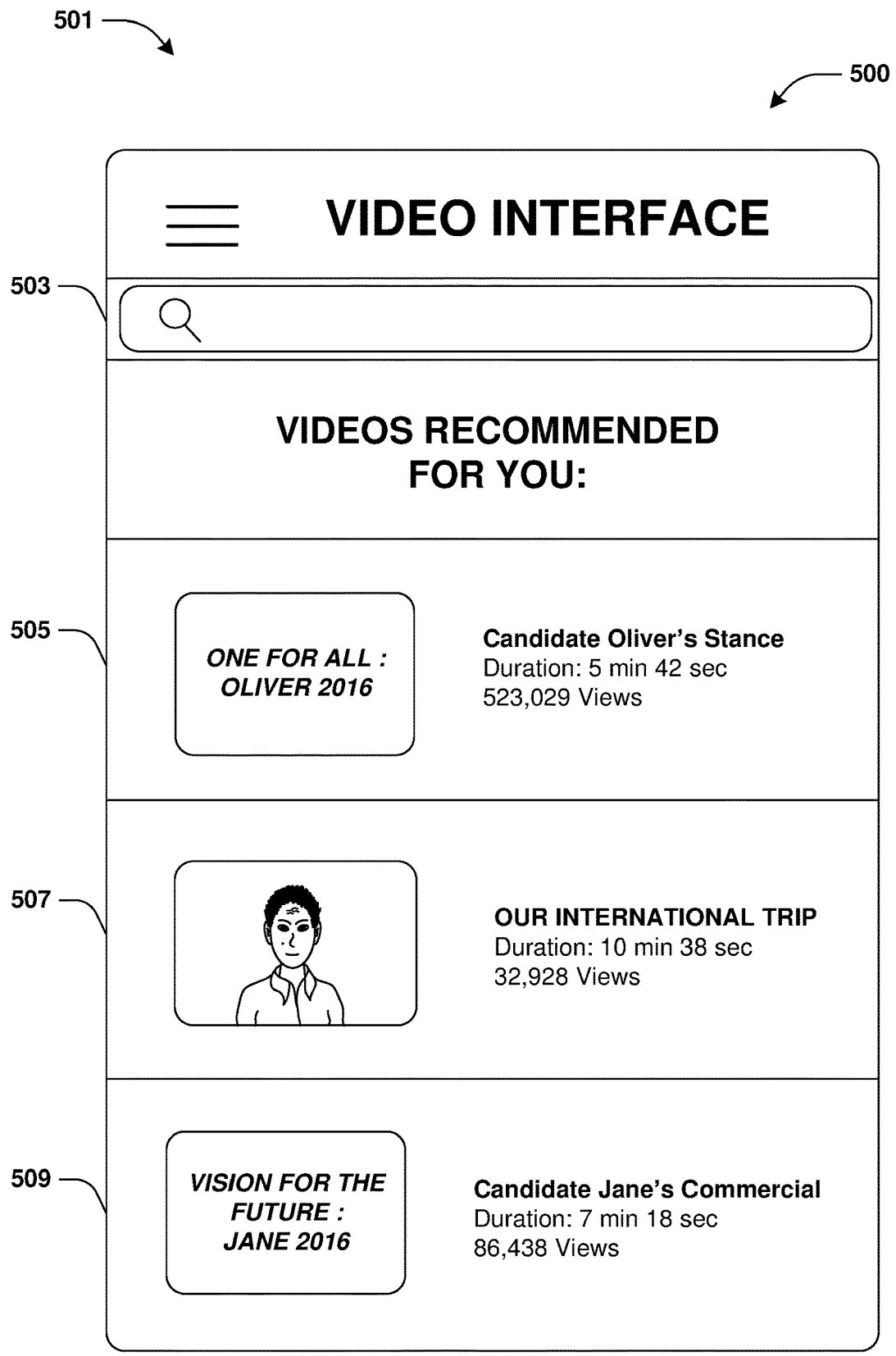
FIG. 5H is a component block diagram illustrating an example system for generating a video in a target language and/or presenting the video via one or more client devices, where a video interface is displayed via a first client device.

FIG. 5H illustrates the video interface being displayed via the first client device (shown with reference number 500). In some examples, videos of the video database (associated with the content system) may be accessed, viewed and/or downloaded via the video interface. In some examples, the video interface may display a search field 528 for searching for videos (of the video database). The video interface may display a list of videos. For example, the list of videos may comprise a first selectable input 505 associated with a third video of the video database, a second selectable input 507 associated with the first video 502 and/or a third selectable input 509 associated with a fourth video of the video database. For example, a selection of the second selectable input 507 may be received (from the first client device 500). In some examples, in response to the selection of the second selectable input 507, the video interface may display a video playback interface for presenting a video associated with the first video 502. In some examples, in response to the selection of the second selectable input 507, the second video 566 may be presented via the first client device 500. For example, the second video 566 (associated with the target language, such as French) may be presented (instead of the first video 502 in the first language and/or other video in a different language, for example) based upon a determination that a user of the first client device 500 prefers content in the target language (e.g., French). For example, the determination that the user of the first client device 500 prefers content in the target language may be based upon one or more language settings of the video interface (e.g., the one or more language settings may indicate French as the preferred language of the user). Alternatively and/or additionally, the determination that the user of the first client device 500 prefers content in the target language may be based upon a location of the first client device 500 being in a region associated with the target language (e.g., the location of the first client device 500 may be in a French-speaking region). In an example, in response to the selection of the second selectable input 507 associated with the first video 502, the target language (e.g., French) may be selected from among a plurality of languages (e.g., the plurality of languages may comprise the target language, the first language and/or one or more other languages), wherein the second video 566 may be presented via the first client device 500 based upon the selection of the target language.

Figure 5I:
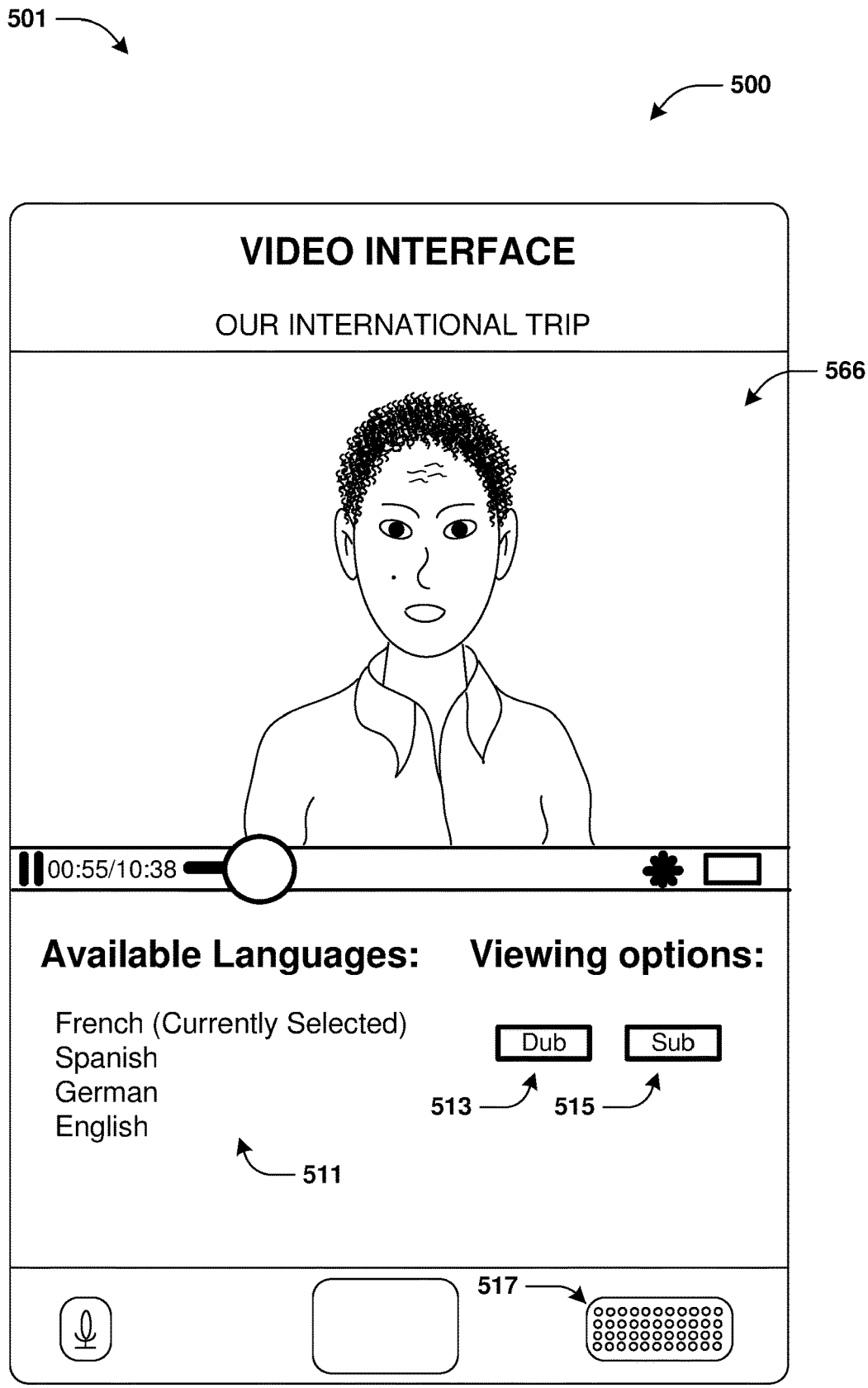
FIG. 5I is a component block diagram illustrating an example system for generating a video in a target language and/or presenting the video via one or more client devices, where a second video is presented via a first client device.

FIG. 5I illustrates the second video 566 being presented via the first client device 500. For example, the second video 566 may be displayed via a display of the first client device 500 and/or the first audio 536 (in the target language) may be output via a loudspeaker 517 of the first client device 500. In some examples, the video interface may display a list of languages 511 (e.g., a list of available languages), such as comprising at least one of French (e.g., the target language), Spanish, German, English (e.g., the original language of the first video 502), etc. In some examples, the list of languages 511 may be indicative of languages for which versions of the first video 502 are available. For example, the video database may comprise the first video 502 (e.g., original language video) in English, the second video 566 in French, and one or more other videos associated with one or more other languages (e.g., the one or more other videos may comprise a third video associated with Spanish, a fourth video associated with German, etc.). Each video of the one or more videos (and audio corresponding to the video, for example) may be generated (e.g., automatically generated) using one or more of the techniques provided herein with respect to generating the second video 566 (and/or one or more of the techniques provided herein with respect to generating the first audio 536). In some examples, the list of languages 511 may comprise selectable inputs, wherein a language may be selected via a selection of a selectable input of the list of languages 511. In some examples, the video interface may comprise a fourth selectable input 513 associated with a dubbing (and/or lip-synchronization) viewing option and/or a fifth selectable input 515 associated with a subtitle viewing option. In some examples, based upon a selection of the fourth selectable input 513 associated with the dubbing (and/or lip-synchronization) viewing option, the video interface may present the second video 566 (in conjunction with the first audio 536 in the target language). In some examples, based upon a selection of the fifth selectable input 515 associated with the subtitle viewing option, the video interface may present the first video 502 (in conjunction with original audio of the first video 502, for example) in conjunction with subtitles in the target language. For example, the subtitles may be generated based upon the translated transcript 516 (in the target language).

In some examples, using one or more of the techniques provided herein, one or more tasks may be performed automatically. The one or more tasks may comprise: (i) generation of closed captions, of the first video 502, in the first language (e.g., original language of the first video 502) using the transcript 506, wherein the closed captions may be displayed during playback of the first video 502 to assist a viewer in understanding dialog of the first video 502; (ii) generation of subtitles, of the first video 502, in one or more languages different from the first language, wherein the subtitles may be displayed during playback of the first video 502 to assist a viewer in understanding dialog of the first video 502; (iii) generation of voice-over audio (e.g., the first audio 536) for the first video 502 in one or more languages different from the first language, wherein in some embodiments (e.g., in scenarios in which the first video 502 cannot be edited for lip synchronization and/or scenarios in which a viewer wants to hear voice-over audio in their own language but watch the original video without lip synchronization) the voice-over audio (e.g., the first audio 536) may be presented in conjunction with the first video 502 (instead of the second video 566, for example); and/or (iv) generation of lip synchronized video (e.g., the second video 566) in which mouth movements of one or more speakers are aligned with voice-over audio in a target language. Thus, in some examples, one, some and/or all of the one or more tasks may be performed automatically to achieve a desired result.

It may be appreciated that the disclosed subject matter may assist a user (e.g., and/or a client device associated with the user) in generating dubbed and/or lip-synchronized videos in one or more languages. Alternatively and/or additionally, the disclosed subject matter may assist a user in consuming and/or viewing a realistic and/or visually appealing dubbed and/or lip-synchronized video.

In some examples, at least some of the disclosed subject matter may be implemented on a client device, and in some examples, at least some of the disclosed subject matter may be implemented on a server (e.g., hosting a service accessible via a network, such as the Internet).

Figure 6:
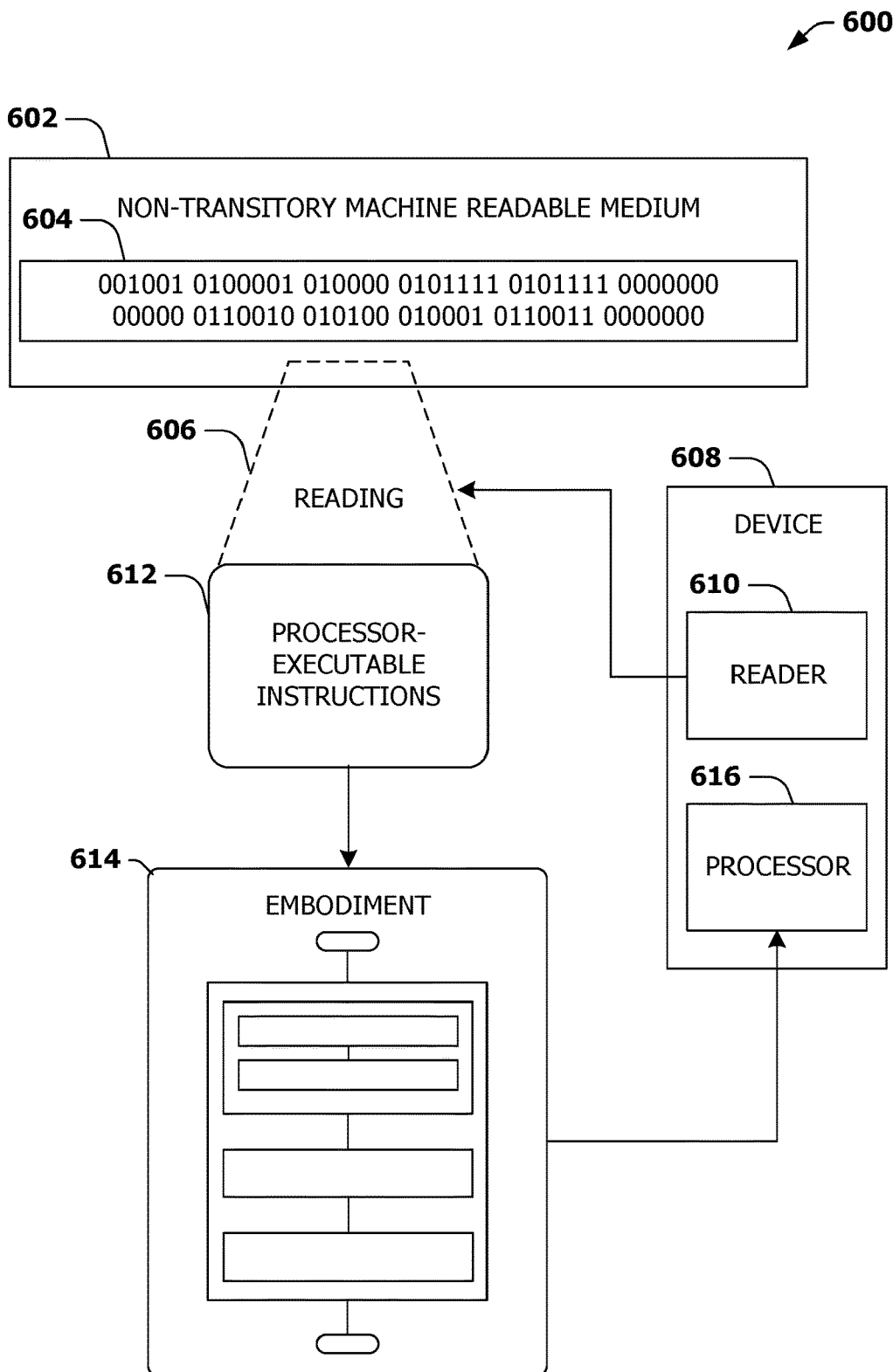
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
identifying a first video;
determining a transcript indicative of speech spoken by a speaker in the first video;
translating the transcript from a first language to a second language to generate a translated transcript in the second language;
determining a speaker profile associated with the speaker, the speaker profile generated based upon second speech of the speaker from a first source of audio identified as being associated with the speaker during analysis of a first internet resource and third speech of the speaker from a second source of audio identified as being associated with the speaker during analysis of a second internet resource;
generating, based upon the translated transcript and the speaker profile associated with the speaker, first audio comprising an auditory representation of the translated transcript being spoken in a voice of the speaker; and
generating, based upon the first video and the first audio, a second video in which mouth movements of the speaker are aligned with speech of the auditory representation of the first audio, wherein generating the second video comprises aligning each audio segment of a plurality of audio segments of the second video with a corresponding video segment of the second video.

2. The method of claim 1, comprising:
presenting the second video via a client device, wherein the presenting the second video comprises:
displaying the second video via a graphical user interface; and
outputting the first audio via a loudspeaker.

3. The method of claim 1, wherein:
the transcript comprises a plurality of text segments;
a first text segment of the plurality of text segments is associated with a first video segment of the first video;
a second text segment of the plurality of text segments is associated with a second video segment of the first video;
the translated transcript comprises a plurality of translated text segments;
a first translated text segment of the plurality of translated text segments is a translation of the first text segment; and
a second translated text segment of the plurality of translated text segments is a translation of the second text segment.

4. The method of claim 3, wherein:
the first text segment corresponds to one or more first sentences; and
the second text segment corresponds to one or more second sentences.

5. The method of claim 3, wherein:
the first audio comprises a plurality of audio segments; and
the generating the first audio comprises:
generating a first audio segment of the plurality of audio segments of the first audio based upon the first translated text segment and a duration of time of the first video segment associated with the first text segment, wherein:
the first audio segment comprises an auditory representation, of the first translated text segment, in the voice of the speaker; and
a duration of time of the first audio segment matches the duration of time of the first video segment associated with the first text segment; and
generating a second audio segment of the plurality of audio segments of the first audio based upon the second translated text segment and a duration of time of the second video segment associated with the second text segment, wherein:
the second audio segment comprises an auditory representation, of the second translated text segment, in the voice of the speaker; and
a duration of time of the second audio segment matches the duration of time of the second video segment associated with the second text segment.

6. The method of claim 5, wherein at least one of:
the generating the first audio segment comprises:
generating, based upon the first translated text segment, a third audio segment comprising an auditory representation, of the first translated text segment, in the voice of the speaker, wherein a duration of time of the third audio segment is longer than the duration of time of the first video segment associated with the first text segment; and
shortening the third audio segment to generate the first audio segment of the plurality of audio segments of the first audio; or
the generating the second audio segment comprises:
generating, based upon the second translated text segment, a fourth audio segment comprising an auditory representation, of the second translated text segment, in the voice of the speaker, wherein a duration of time of the fourth audio segment is shorter than the duration of time of the second video segment associated with the second text segment; and
lengthening the fourth audio segment to generate the second audio segment of the plurality of audio segments of the first audio.

7. The method of claim 6, wherein at least one of:
the shortening the third audio segment comprises increasing a speed of audio of the third audio segment; or
the lengthening the fourth audio segment comprises padding the fourth audio segment.

8. The method of claim 1, wherein the generating the second video comprises:
identifying a face of the speaker in the first video; and
modifying, based upon the first audio, pixels of the first video to generate the second video in which mouth movements, of the speaker, are aligned with the speech of the first audio, wherein the pixels of the first video that are modified correspond to a portion, of the face, comprising a mouth of the face.

9. The method of claim 8, wherein:
the generating the second video comprises aligning a first audio segment of the plurality of audio segments of the second video with a corresponding first video segment of the second video by lengthening the first audio segment by padding the first audio segment with silence that was not in a corresponding first audio segment in the first video.

10. The method of claim 8, comprising:
generating a face profile associated with the speaker based upon one or more images comprising a face of the speaker, wherein the identifying the face of the speaker in the first video comprises performing, based upon the face profile, facial recognition on the first video.

11. The method of claim 1, comprising:
generating the speaker profile associated with the speaker based upon audio of the first video.

12. The method of claim 1, wherein:
the speaker profile comprises a vector representation generated based upon the second speech of the speaker.

13. A computing device comprising:
a processor; and
memory comprising processor-executable instructions that when executed by the processor cause performance of operations, the operations comprising:
identifying a first video;
determining a transcript indicative of speech spoken by a speaker in the first video;
translating the transcript from a first language to a second language to generate a translated transcript in the second language;
determining a speaker profile associated with the speaker, the speaker profile generated based upon second speech of the speaker from a first source of audio identified as being associated with the speaker during analysis of a first internet resource and third speech of the speaker from a second source of audio identified as being associated with the speaker during analysis of a second internet resource;
generating, based upon the translated transcript and the speaker profile associated with the speaker, first audio comprising an auditory representation of the translated transcript being spoken in a voice of the speaker; and
generating, based upon the first video and the first audio, a second video in which mouth movements of the speaker are aligned with speech of the auditory representation of the first audio, wherein generating the second video comprises aligning each audio segment of a plurality of audio segments of the second video with a corresponding video segment of the second video.

14. The computing device of claim 13, the operations comprising:
presenting the second video via a client device, wherein the presenting the second video comprises:
displaying the second video via a graphical user interface; and
outputting the first audio via a loudspeaker.

15. The computing device of claim 13, wherein:
the transcript comprises a plurality of text segments;
a first text segment of the plurality of text segments is associated with a first video segment of the first video;
a second text segment of the plurality of text segments is associated with a second video segment of the first video;
the translated transcript comprises a plurality of translated text segments;
a first translated text segment of the plurality of translated text segments is a translation of the first text segment; and
a second translated text segment of the plurality of translated text segments is a translation of the second text segment.

16. The computing device of claim 15, wherein:
the first audio comprises a plurality of audio segments; and
the generating the first audio comprises:
generating a first audio segment of the plurality of audio segments of the first audio based upon the first translated text segment and a duration of time of the first video segment associated with the first text segment, wherein:
the first audio segment comprises an auditory representation, of the first translated text segment, in the voice of the speaker; and
a duration of time of the first audio segment matches the duration of time of the first video segment associated with the first text segment; and
generating a second audio segment of the plurality of audio segments of the first audio based upon the second translated text segment and a duration of time of the second video segment associated with the second text segment, wherein:
the second audio segment comprises an auditory representation, of the second translated text segment, in the voice of the speaker; and
a duration of time of the second audio segment matches the duration of time of the second video segment associated with the second text segment.

17. The computing device of claim 16, wherein at least one of:
the generating the first audio segment comprises:
generating, based upon the first translated text segment, a third audio segment comprising an auditory representation, of the first translated text segment, in the voice of the speaker, wherein a duration of time of the third audio segment is longer than the duration of time of the first video segment associated with the first text segment; and
shortening the third audio segment to generate the first audio segment of the plurality of audio segments of the first audio; or
the generating the second audio segment comprises:
generating, based upon the second translated text segment, a fourth audio segment comprising an auditory representation, of the second translated text segment, in the voice of the speaker, wherein a duration of time of the fourth audio segment is shorter than the duration of time of the second video segment associated with the second text segment; and
lengthening the fourth audio segment to generate the second audio segment of the plurality of audio segments of the first audio.

18. The computing device of claim 16, wherein the generating the second video comprises:
- generating a third video segment, of the second video, based upon the first audio segment of the plurality of audio segments of the first audio and the first video segment of the first video; and
- generating a fourth video segment, of the second video, based upon the second audio segment of the plurality of audio segments of the first audio and the second video segment of the first video.

19. A non-transitory machine readable medium having stored thereon processor-executable instructions that when executed cause performance of operations, the operations comprising:
- identifying a first video in which a first speaker speaks in a first language;
- determining a translated transcript, in a second language, indicative of a translation of speech spoken by the first speaker in the first video;
- determining a speaker profile associated with a second speaker, the speaker profile generated based upon second speech of the second speaker from a first source of audio identified as being associated with the second speaker during analysis of a first internet resource and third speech of the second speaker from a second source of audio identified as being associated with the second speaker during analysis of a second internet resource;
- generating, based upon the translated transcript and the speaker profile associated with the second speaker, first audio comprising an auditory representation of the translated transcript being spoken in a voice of the second speaker; and
- generating, based upon the first video and the first audio, a second video in which mouth movements of the first speaker are aligned with speech of the auditory representation of the first audio.

20. The non-transitory machine readable medium of claim 19, wherein:
- the second speaker is the same as the first speaker.

\* \* \* \* \*